(12) United States Patent
Abernathy et al.

(10) Patent No.: US 7,796,853 B2
(45) Date of Patent: Sep. 14, 2010

(54) FIBER OPTIC CABLES AND ASSEMBLIES FOR FIBER TOWARD THE SUBSCRIBER APPLICATIONS

(75) Inventors: George C. Abernathy, Hidebran, NC (US); Kenneth D. Temple, Jr., Newton, NC (US); David A. Seddon, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/419,425

(22) Filed: Apr. 7, 2009

(65) Prior Publication Data
US 2009/0232460 A1  Sep. 17, 2009

Related U.S. Application Data

(63) Continuation of application No. 11/986,705, filed on Nov. 26, 2007, now Pat. No. 7,539,380.

(51) Int. Cl.
G02B 6/44 (2006.01)
(52) U.S. Cl. ........................................ 385/100; 385/113
(58) Field of Classification Search ........................ None
See application file for complete search history.

(56) References Cited

U.S. PATENT DOCUMENTS

| | | | |
|---|---|---|---|
| 3,887,265 A | 6/1975 | Margolis et al. | 350/96 |
| 4,359,598 A | 11/1982 | Dey et al. | 174/40 |
| 4,401,361 A | 8/1983 | Slaughter | 350/96.23 |
| 4,420,220 A | 12/1983 | Dean et al. | 350/96.23 |
| 4,729,628 A | 3/1988 | Kraft et al. | 350/96.23 |
| 4,836,640 A | 6/1989 | Gartside, III et al. | 350/96.23 |
| 5,082,719 A | 1/1992 | Arroyo | 428/219 |
| 5,109,457 A | 4/1992 | Panuska et al. | 385/102 |
| 5,155,304 A | 10/1992 | Gossett et al. | 174/117 |
| 5,188,883 A | 2/1993 | Rawlyk | 428/189 |
| 5,230,033 A | 7/1993 | Soodak | 385/105 |
| 5,371,825 A | 12/1994 | Traut | 385/109 |

(Continued)

FOREIGN PATENT DOCUMENTS

EP     0784220 A1     7/1997

(Continued)

OTHER PUBLICATIONS

Optoelectronic Industry and Technology Development Association (Japan), Technical Paper, TP-BW01-2007, "Optical fiber distribution system for detached houses in FTTH", Jul. 2007, 20 pgs.

(Continued)

*Primary Examiner*—Tina M Wong
(74) *Attorney, Agent, or Firm*—C. Keith Montgomery

(57) ABSTRACT

Disclosed are fiber optic cables and assemblies for routing optical networks closer to the subscriber. The fiber optic cables have a robust design that is versatile by allowing use in aerial application with a pressure clamp along with use in buried and/or duct applications. Additionally, the fiber optic cables and assemblies have a relatively large slack storage capacity for excess length. Assemblies include hardened connectors such as plugs and/or receptacles suitable for outdoor plant applications attached to one or more ends of the fiber optic cables for plug and play connectivity.

11 Claims, 20 Drawing Sheets

U.S. PATENT DOCUMENTS

| | | | |
|---|---|---|---|
| 5,448,670 A | 9/1995 | Blew et al. | 385/112 |
| 5,469,523 A | 11/1995 | Blew et al. | 385/101 |
| 5,651,081 A | 7/1997 | Blew et al. | 385/101 |
| 6,088,499 A | 7/2000 | Newton et al. | 385/112 |
| 6,101,305 A | 8/2000 | Wagman et al. | 385/113 |
| 6,160,939 A | 12/2000 | Sheu | 385/109 |
| 6,192,178 B1 | 2/2001 | Logan et al. | 385/109 |
| 6,249,628 B1 | 6/2001 | Rutterman et al. | 385/106 |
| 6,249,629 B1 | 6/2001 | Bringuier | 385/113 |
| 6,278,824 B1 | 8/2001 | Bosisio et al. | 385/100 |
| 6,424,771 B1 | 7/2002 | Sheu | 385/109 |
| 6,501,888 B2 | 12/2002 | Gimblet et al. | 385/113 |
| 6,542,674 B1 | 4/2003 | Gimblet | 385/113 |
| 6,567,592 B1 | 5/2003 | Gimblet et al. | 385/113 |
| 6,714,710 B2 | 3/2004 | Gimblet | 385/113 |
| 6,789,950 B1 | 9/2004 | Loder et al. | 385/53 |
| 6,909,821 B2 | 6/2005 | Ravasio et al. | 385/24 |
| 7,090,406 B2 | 8/2006 | Melton et al. | 385/62 |
| 7,090,407 B2 | 8/2006 | Melton et al. | 385/62 |
| 7,111,990 B2 | 9/2006 | Melton et al. | 385/53 |
| 7,113,679 B2 | 9/2006 | Melton et al. | 385/113 |
| 2006/0165355 A1* | 7/2006 | Greenwood et al. | 385/100 |
| 2006/0269198 A1 | 11/2006 | Blazer et al. | 385/100 |
| 2007/0031103 A1 | 2/2007 | Tinucci et al. | 385/139 |
| 2008/0175541 A1 | 7/2008 | Lu et al. | 385/62 |
| 2008/0175542 A1 | 7/2008 | Lu et al. | 385/62 |
| 2008/0175546 A1 | 7/2008 | Lu et al. | 385/92 |

FOREIGN PATENT DOCUMENTS

| | | |
|---|---|---|
| JP | 50-147745 | 11/1975 |
| JP | 8-304675 | 11/1996 |
| WO | WO2006/105034 | 10/2006 |

OTHER PUBLICATIONS

Fujikura Ltd., Product Spec Sheet, "DC-1/Drop Cable", 2003, 1pg.

* cited by examiner

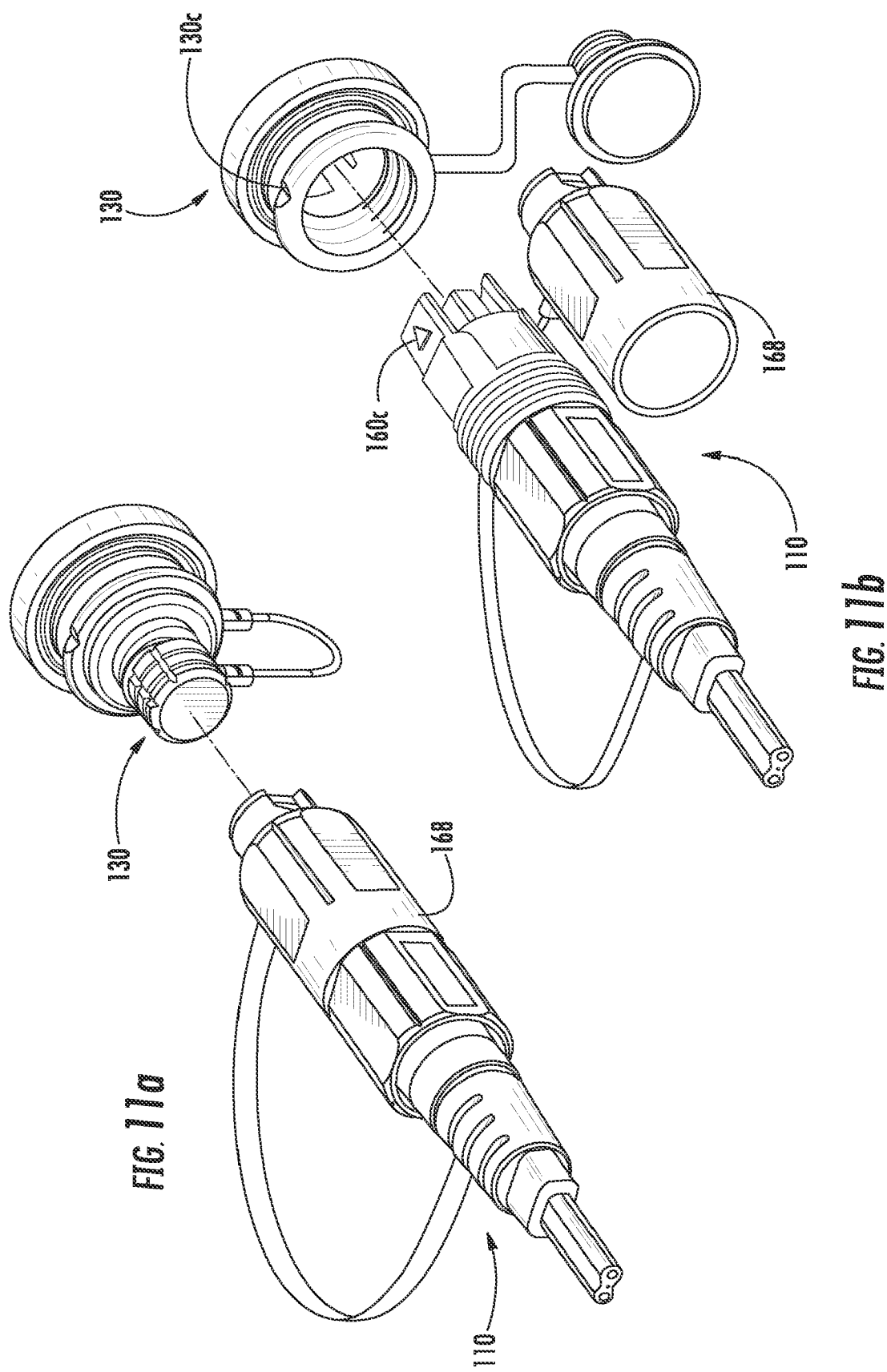

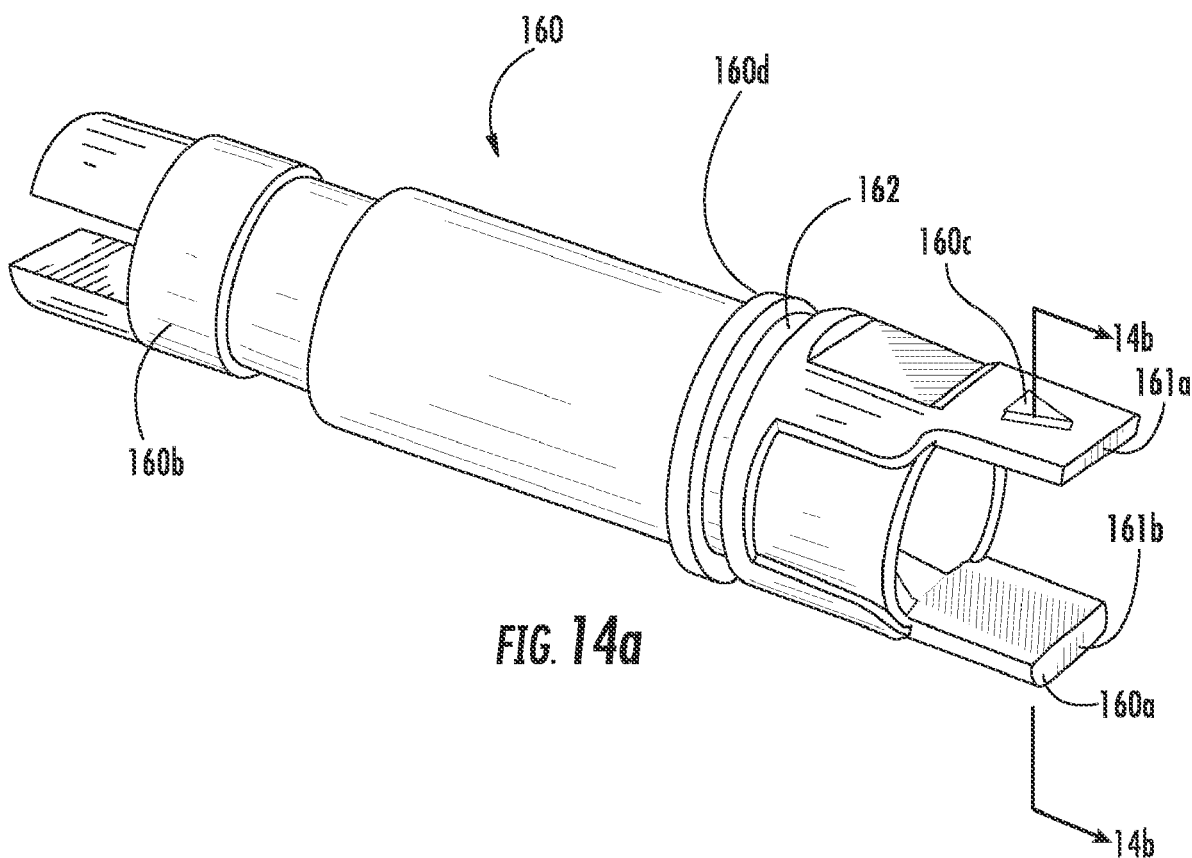
FIG. 14a
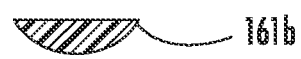
FIG. 14b

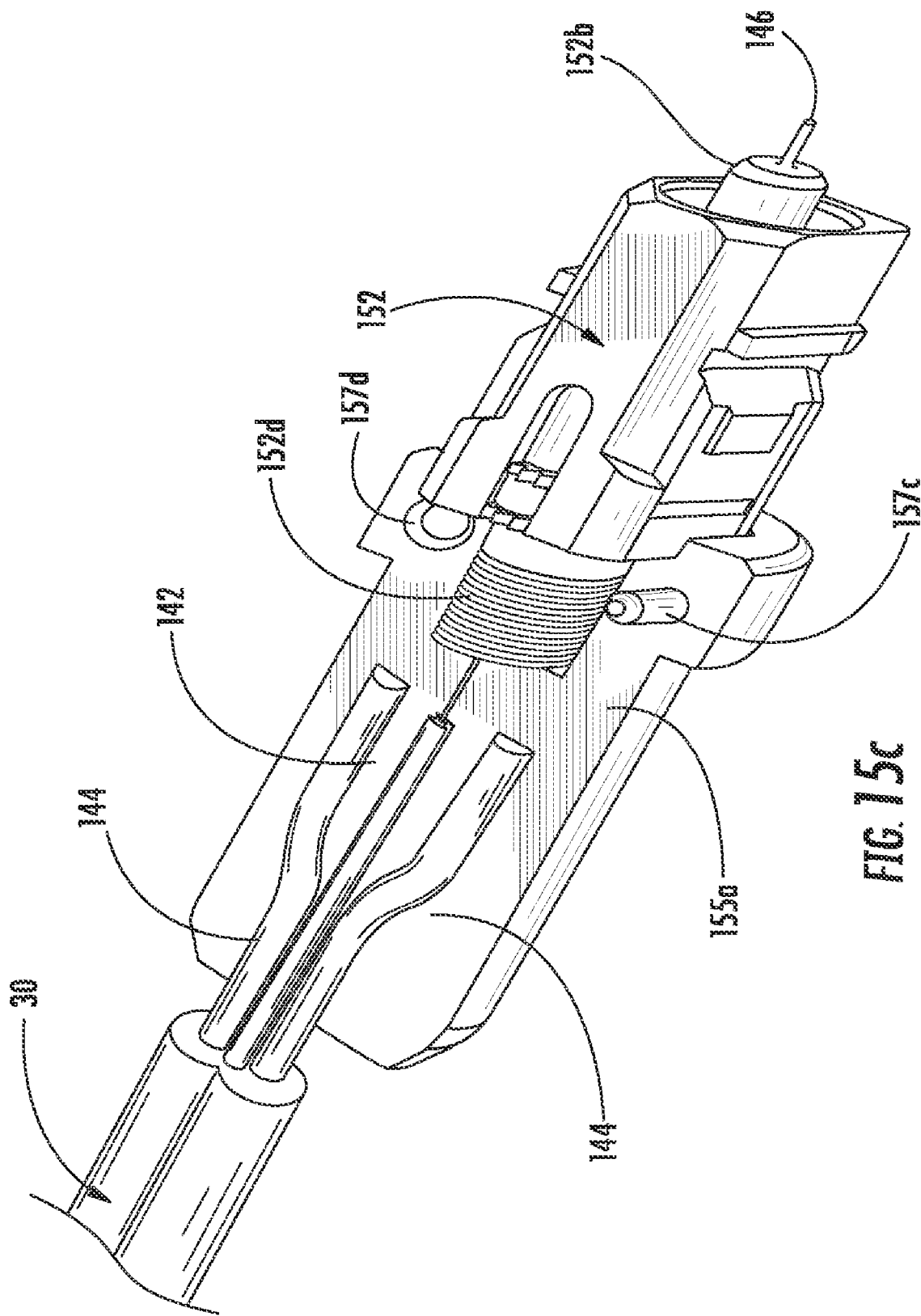

FIBER OPTIC CABLES AND ASSEMBLIES FOR FIBER TOWARD THE SUBSCRIBER APPLICATIONS

RELATED APPLICATION

This application is a Continuation of U.S. application Ser. No. 11/986,705, filed Nov. 26, 2007 now U.S. Pat. No. 7,539,380, the entire contents of which are hereby incorporated by reference.

FIELD OF THE INVENTION

The present invention relates to fiber optic cables and assemblies suitable fiber optic networks such as fiber to the subscriber or fiber to the node applications. More particularly, the present invention relates generally to fiber optic cables having a robust design with a relatively large slack storage capacity for excess length along with associated assemblies for plug and play connectivity.

BACKGROUND

Communications networks are used to transport a variety of signals such as voice, video, data and the like to subscribers. Service providers are routing optical fiber deeper into communication networks, thereby increasing the bandwidth available to subscribers for receiving the desired content. More specifically, service providers are routing optical fiber to the premises of subscribers instead of copper, thereby dramatically increasing the bandwidth available to subscribers for emerging applications. FIG. 1 schematically illustrates two preconnectorized fiber optic cables 10 and 10' being routed to a premise of a subscriber using two different exemplary installation techniques. Specifically, FIG. 1 shows a first preconnectorized fiber optic cable 10 being routed to premises 20 in an aerial installation and a second preconnectorized fiber optic cable 10' being routed to premises 20 in a buried installation. In the aerial installation, a first end 10a of preconnectorized cable 10 is attached at a first interface device 12 located at, or near, a pole 11 and a second end 10b of preconnectorized cable 10 is attached at a second interface device 14 located at premise 20. By way of example, first interface device 12 may be a closure, multiport (a device having multiple receptacles), or the like and second interface device 14 may be a closure, network interface device (NID), optical network terminal (ONT), or the like. In the aerial installation, the craft typically uses a pressure clamp 19 (i.e., a p-clamp) as schematically shown in FIG. 1 for securing fiber optic cable 10 under tension at, or near, pole 11 and/or premises 20, thereby avoiding undue sag in fiber optic cable 10 along the aerial span.

FIG. 2 depicts a 2 PR pressure clamp 19 such as available from Reliable Power Products of Franklin Park, Ill. as well as from others with a portion of fiber optic cable 10 disposed therein. Pressure clamp 19 includes a body 19a, a grip 19b, and a wedge 19c for clamping (i.e., squeezing) the fiber optic cable with increasing frictional force as the tension on the fiber optic cable is increased. Body 19a receives fiber optic cable 10 between grip 19b and wedge 19c and squeezes it therebetween as tensile forces are applied. Body 19a also includes a loop end used for attaching it to pole 11, premises 20, or other structure. Simply stated, the frictional force on the fiber optic cable increases as tension force of the fiber optic cable pulls wedge 19c tighter onto the fiber optic cable, thereby preventing the fiber optic cable from pulling out of the pressure clamp. It is possible for the clamping (i.e., frictional) force from pressure clamp 19 to plastically deform the fiber optic cable therein or even severely damage the same since grip 19b has dimples and body 19a has ridges. Pressure clamp 19 can not be used with all fiber optic cable designs since it may cause damage and/or elevated levels of optical attenuation. Consequently, other types of devices that do not clamp the optical portion of the fiber optic cable are also used for securing fiber optic cables such as wire vises, winding posts, and the like. Simply stated, conventional fiber optic cables used with in pressure clamp 19 uses a buffer tube for protecting the optical fibers while allowing use within while maintaining acceptable optical performance and reliability.

In buried or duct applications, the first and second ends of preconnectorized cable 10' are respectively connected to an interface device 16 located at a field location 18 such as inside a pedestal, a manhole, a handhole or the like and second interface device 14. The interface devices may include at least one receptacle (not visible) for making the optical connection with a plug end of preconnectorized fiber optic cable 10. Like aerial applications, buried or duct applications can also require a rugged fiber optic cable design. For instance, the fiber optic cable can encounter rough terrain such as being pushed against rocks, or the like or rough handling during installation such as pulling into a duct. Thus, for fiber to the subscriber applications the preconnectorized fiber optic cable should be robust enough to handle either an aerial, buried, and/or duct installations while maintaining suitable optical performance and reliability.

Further, the distance between pole 11, or field location 18, to the second interface device 14 at premises 20 varies with each specific installation. By way of example, if the distance between pole 11 and second interface device is 30 meters, then the craftsman may select a 50 meter preconnectorized fiber optic cable 10 for managing the length of cable for slack storage (i.e., the storage of excess 20 meter length). For instance, the slack cable length may be stored behind the second interface device 14, or other suitable location. Because this excess length for slack storage can take a substantial amount of space, may look unsightly, and/or there may be a limited space available, the craft, generally speaking, selects a length of preconnectorized fiber optic cable from his inventory that minimizes the length for slack storage for the particular installation. Consequently, the craft carries many different lengths of preconnectorized fiber optic cables into the field to accommodate these varying distances while accommodating the slack storage limitation. For instance, the craft may carry up to fifteen different lengths of preconnectorized fiber optic cables into the field, which creates complexity issues for the craft, the service provider, and the manufacturer.

BRIEF DESCRIPTION OF THE DRAWINGS

FIGS. 11a-11c shows fiber optic cable of FIG. 3 that was preconnectorized with an exemplary hardened connector according to the present invention in various stages of being plugged into a complementary receptacle.

FIGS. 14a and 14b respectively depict a perspective view and a sectional view of the shroud of the hardened connector of FIG. 13.

FIG. 15c shows a partially assembled view of the preconnectorized fiber optic cable of FIG. 13.

DETAILED DESCRIPTION

Figure 1:
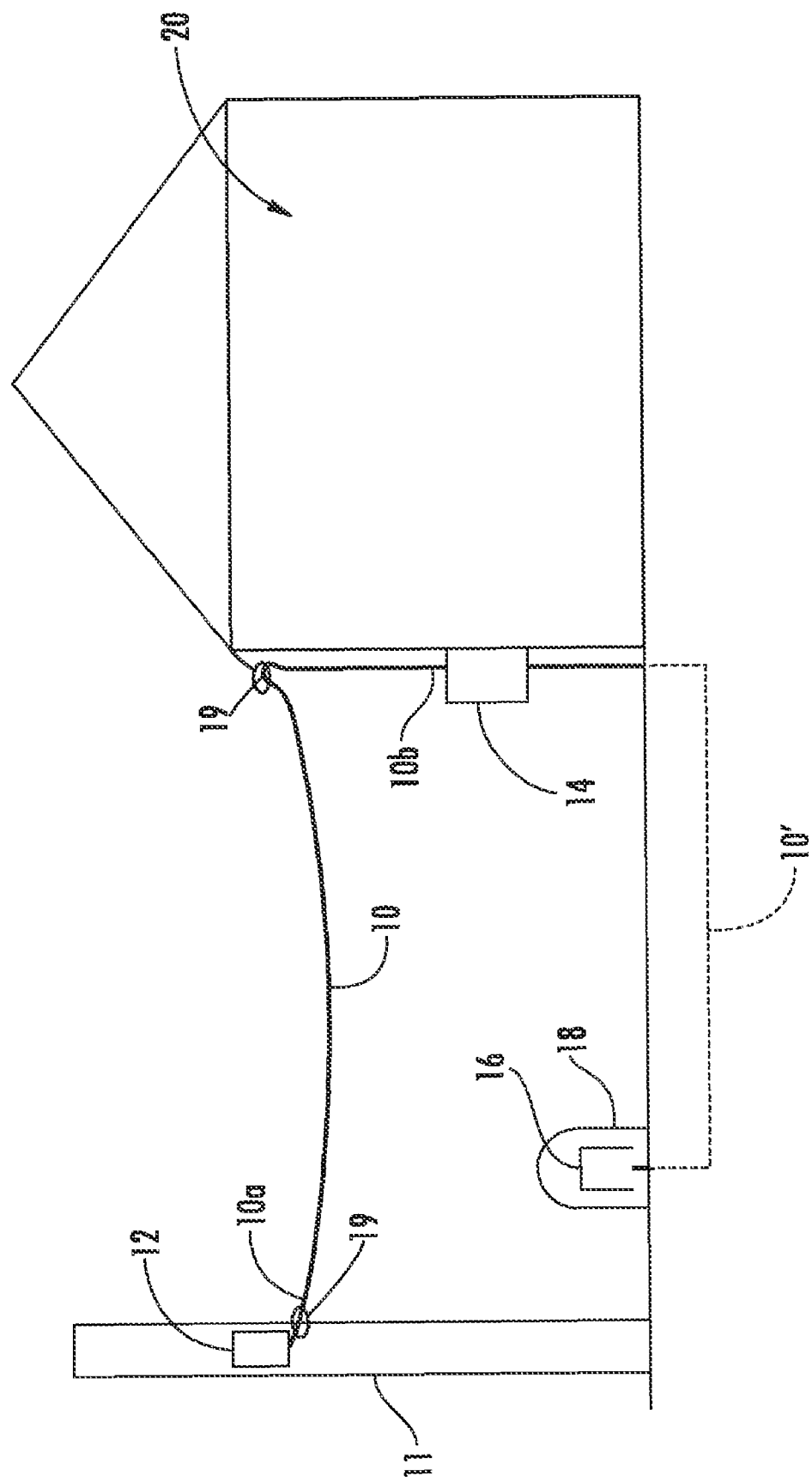
FIG. 1 schematically illustrates the drop link portion of an optical network being routed to a premises using different installations techniques.
Figure 2:
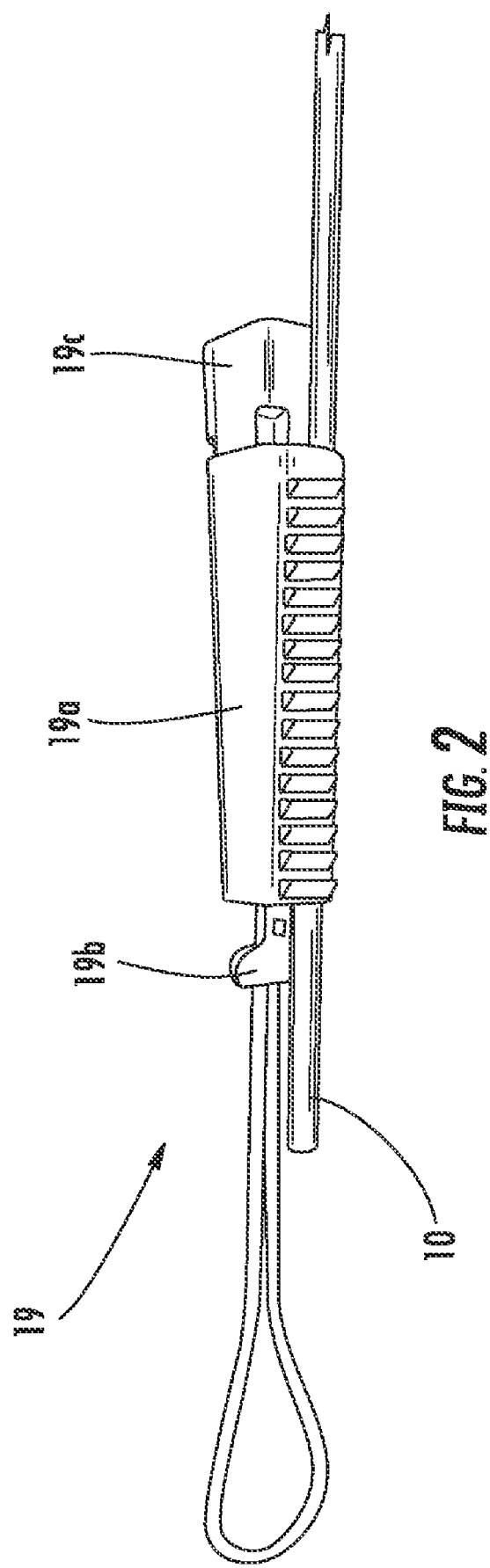
FIG. 2 is a perspective view of a portion of a fiber optic cable held within a typical pressure clamp used in aerial applications.
Figure 3:
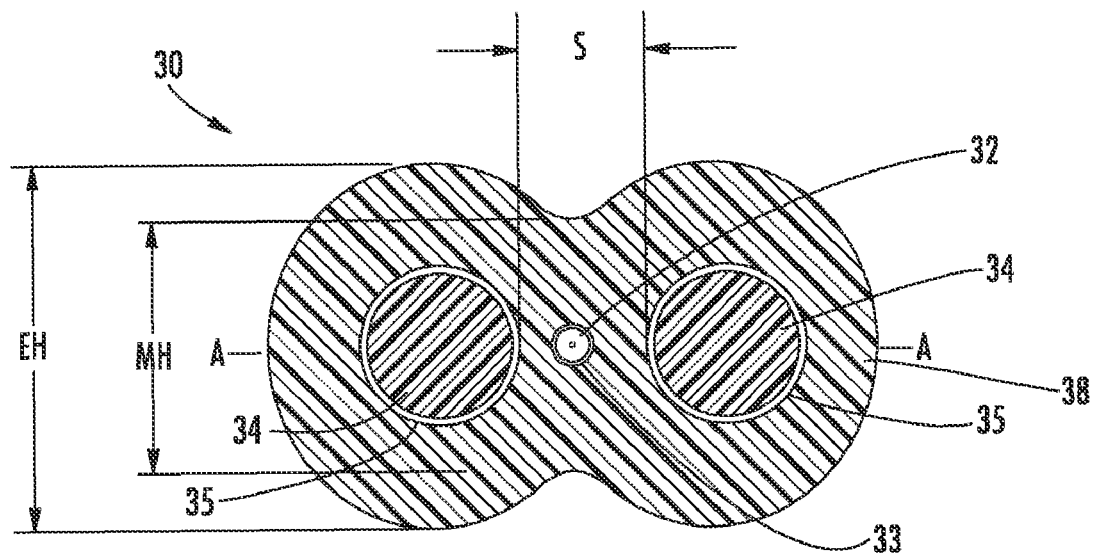
FIG. 3 is a cross-sectional view of a fiber optic cable according to the present invention.

Reference will now be made in detail to the present preferred embodiments of the invention, examples of which are illustrated in the accompanying drawings. When practical, the same reference numerals will be used throughout the drawings to refer to the same or like parts. FIG. 3 is a cross-sectional view of a fiber optic cable 30 having at least one optical fiber 32, a first and a second strength component 34, and a cable jacket 38. First and second strength components 34 are disposed on opposite sides of optical fiber 32 and generally aligned along a common plane A-A, thereby providing a preferential bend characteristic to fiber optic cable 30. As depicted, cable jacket 38 contacts the optical fiber 32 and first and second strength members 34. Cable jacket 38 has a medial height MH disposed about optical fiber 32 that is less than an end height EH of fiber optic cable 30, which is advantageous for preserving optical performance during clamping within pressure clamp 19 as discussed herein. Fiber optic cable 30 is also advantageous because it has a relatively small cross-sectional footprint compared with conventional fiber optic drop cables used for fiber to the subscriber, or node, applications, thereby providing a relatively large slack storage capacity for excess length while still being robust.

Figure 4:
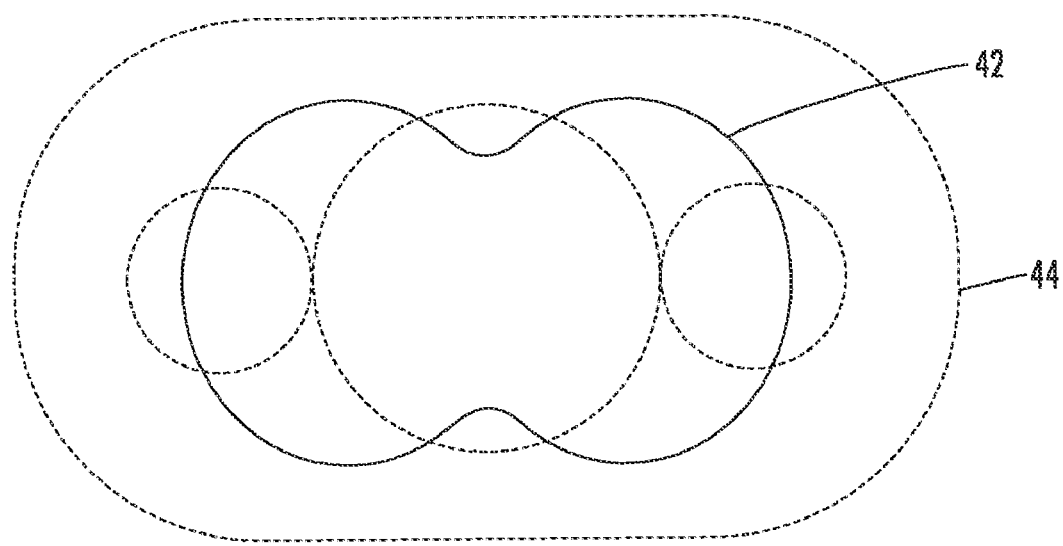
FIG. 4 depicts a cross-sectional area of the fiber optic cable of FIG. 3 superimposed on a conventional fiber optic drop cable.

For comparison purposes, FIG. 4 schematically depicts a cross-sectional footprint 42 of fiber optic cable 30 (represented by solid lines) superimposed onto a cross-sectional footprint 44 for a conventional fiber optic cable (represented by phantom lines with outlines of the buffer tube and strength members also shown) for fiber to the subscriber applications. As shown, the cross-sectional footprint 42 of fiber optic cable 30 is substantially smaller than the cross-sectional footprint 44 of conventional fiber optic cable while still providing a robust design for use within a 2PR pressure clamp 19. Remarkably, cross-sectional footprint 42 is about 42% of the cross-sectional footprint 44 (e.g., about 13.2 millimeters squared compared to about 31.5 millimeters squared) while still working within pressure clamp 19. Cross-sectional footprint 42 is substantially smaller than cross-sectional footprint 44 since it does not require a buffer tube (represented by the middle circle in phantom) for housing and protecting optical fiber 32 when used within pressure clamp 19 like the conventional fiber optic cable. Moreover, fiber optic cable 30 does not require special installation procedures such as separation or isolation of the optical fiber from the clamping force of pressure clamp 19 such as with other device for aerial applications. Simply stated, the portion of fiber optic cable 30 having optical fiber 32 therein can be placed within pressure clamp 19 while maintaining suitable optical performance without having a buffer tube (or other similar structure) for protecting the optical fiber. Likewise, fiber optic cable 30 can also withstand the requirements of buried and/or duct applications.

By way of example, fiber optic cable 30 has a height H of about 3.0 millimeters and a width W of about 5.3 millimeters while still providing suitable optical performance when subjected to the clamping force of pressure clamp 19. The concepts of the present invention may be used with fiber optic cables having other suitable dimensions and/or shapes as shown in Table 1. Moreover, the smaller cross-sectional footprint of fiber optic cable 30 allows for a smaller coil diameter compared with the conventional fiber optic cable. Consequently, fiber optic cable 30 advantageously allows storing relatively long lengths of the same in a relatively small volume (i.e., space) such as at the network interface device at the subscriber's premise, closure, pedestal, or other suitable locations. Moreover, since longer lengths of fiber optic cable 30 can be stored in smaller spaces the craft can carry fewer lengths of preconnectorized assemblies into the field while still accommodating limited storage space constraints. In other words, fiber optic cable 30 allows relatively large lengths of slack storage in small spaces for aerial installations and/or buried installations, while still providing suitable optical performance within pressure clamp 19. Moreover, the service provider and manufacturer can advantageously stock fewer lengths of preconnectorized fiber optic cables such as a short length and a long length.

Fiber optic cable 30 is also advantageous because it has a relatively low weight and small footprint for ice and wind loading such as under NESC heavy loading conditions. As such, lower tensile forces are required for maintaining suitable sag for fiber optic cable 30 in aerial installations, which results in lower tensile forces being applied to subscriber's premises from tension forces applied to the pressure clamp. Illustratively, a 1% sag of fiber optic cable 30 in a 150 foot aerial span may be achieved with a tensile force of about 20 pounds (about a 30% reduction in tensile force compared with the conventional fiber optic drop cable shown in FIG. 4), which also makes fiber optic cable 30 easier for the craft to install. Table 1 compares characteristics (i.e., the overall dimensions, coiling capacity, and weight) of fiber optic cable 30 with the conventional fiber optic cable schematically illustrated in FIG. 4 in the first two rows. Table 1 also includes size variations of fiber optic cable 30 listed as fiber optic cable 30' and fiber optic cable 30" for illustrating the ranges of the characteristics. Because conventional fiber optic cable of FIG. 4 has one or more optical fibers within a 3.0 millimeter buffer tube it has an overall cable width of about 8.1 millimeters and cable height of about 4.4 millimeters.

TABLE 1

Comparison of conventional cable with fiber optic cable 30 and size variations thereof

| Cable | Overall width and height (mm) | Volume for coiling 60 meters of fiber optic cable (cm$^3$) | Weight of cable (kg/km) |
|---|---|---|---|
| Conventional cable | 8.1 × 4.4 | 8600 | 31 |
| Fiber optic cable 30 | 5.3 × 3.0 | 4300 | 15 |
| Fiber optic cable 30' | 5.9 × 3.25 | 4900 | 19 |
| Fiber optic cable 30" | 5.0 × 2.65 | 3760 | 13 |

Specifically, the first two rows of Table 1 shows that 60 meters of the fiber optic cable 30 can be coiled and stored in a space having a volume of about 4300 cubic centimeters or less, which is half of the volume (i.e., space) required for the same length with the conventional fiber optic cable. Part of the reason for the increase in slack storage is that fiber optic cable 30 can be coiled into a smaller diameter compared with the conventional fiber optic cable (i.e., fiber optic cable has a smaller bend radius). By way of example, fiber optic cable using 1.25 millimeter glass-reinforced plastic can begin being coiled with a diameter of about 12.5 centimeters or less, whereas the conventional fiber optic cable can begin being coiled with a diameter of about 16 centimeters. The other reason that fiber optic cable 30 has a dramatic increase in the slack storage characteristic is because the cross-sectional area of fiber optic cable 30 is much smaller (i.e., about 42% of the conventional fiber optic cable area as depicted in FIG. 4). Moreover, fiber optic cable 30 has a considerable reduction in weight compared with the conventional fiber optic cable. Specifically, fiber optic cable 30 has a weight of about 15 kilograms or less per kilometer of length compared with a weight of about 31 kilograms per kilometer of length for the conventional fiber optic cable schematically illustrated in FIG. 4. This is a dramatic reduction in weight and increase in storage capacity which is surprising for fiber optic cables that are capable of being GR-20, RDUP, IEC, or ICEA compliant. Thus, the slack storage and weight characteristics along with the performance of fiber optic cable 30 within pressure clamp 19 (as discussed below) provide the craft with a versatile fiber optic cable design for fiber optic networks.

Table 1 also lists size variations for fiber optic cable 30 and how changes in size affect the storage capacity and weight of the design. As shown by fiber optic cable 30', if the size increases slightly, then the storage capacity decreases and the weight increases to about 19 kilograms per kilometer or less. Likewise, if the size decreases slightly, then the space for storage capacity of 60 meters decreases to about 3760 cubic centimeters or less and the weight per kilometer decreases as shown by fiber optic cable 30". Additionally, fiber optic cables according to the invention are useful for other applications in optical networks such as a tether cable that forms a portion of a distribution fiber optic cable assembly, as a jumper cable assembly, attached to a multiport device, or the like.

Figure 15A:
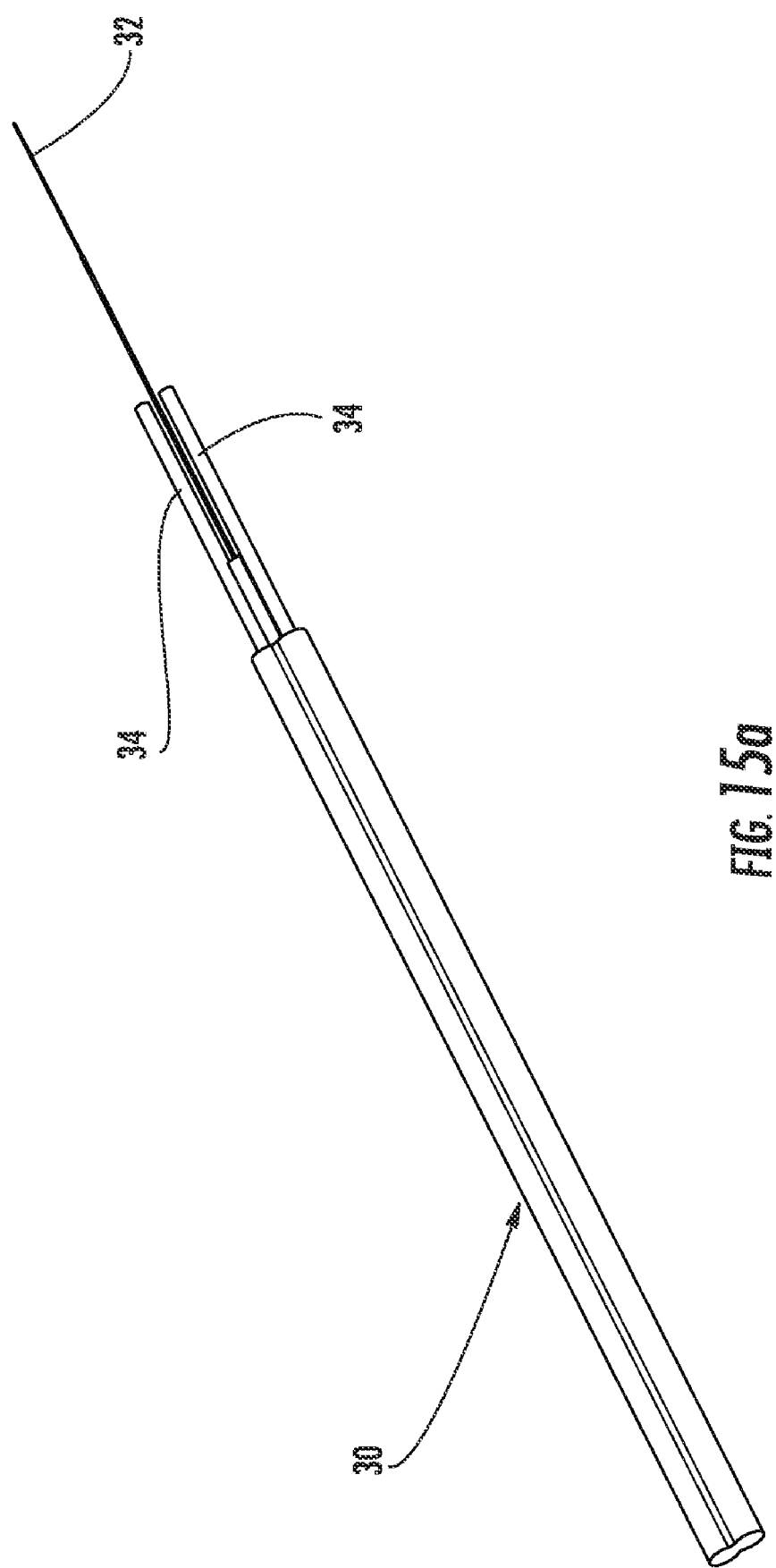
FIG. 15a is a perspective view of the fiber optic cable of FIG. 3 prepared for connectorization.

Generally speaking, strength members 34 are much larger in size than optical fiber 32 and are selected to provide the desired tensile strength requirements for fiber optic cable 30. By way of example, strength members 34 are dielectric members such as glass-reinforced plastic (GRPs) having a diameter of about 1.25 millimeters, but other sizes, shapes, and/or materials are possible for the strength members. For instance, strength members 34 can have an oval, rectangular, or other shape and/or be formed from steel or the like. If strength members 34 are formed from steel, then the fiber optic cable is no longer a dielectric design, but the cable may be able to be wrapped around structures for tie-down since the steel or metal strength members have a shape memory. If fiber optic cable 30 is intended for use with pressure clamps, then strength members 34 should be suitably bonded with cable jacket 38; otherwise, cable jacket 38 may be pulled from strength members 34 by pressure clamp 19 which can cause catastrophic failure. To promote bonding with cable jacket 38, strength members 34 may include one or more adhesion promoters 35 thereon such as selected from the ethylene-acrylic family such as an ethylene-acrylic acid (EAA), but other materials or mechanisms. For instance, bonding can be mechanical bonding by using a strength component with a rough surface or the like. Likewise, if intended for use with pressure clamp 19, strength members 34 should have a spacing S of about 1 millimeter apart between inner surfaces to keep the clamped cable jacket 38 from moving into the optical fiber zone and pressing against optical fiber 32, thereby causing elevated levels of optical attenuation. More specifically, spacing between inner surfaces of strength members 34 should be in the range of 0.8 millimeters to about 1.5 millimeters, thereby leaving a wall thickness of between about 0.4 to about 0.75 disposed about a single optical fiber when exposing and removing strength members 34 as shown in FIG. 15a. Spacing S being relatively small also helps with the relatively large storage capacity of the fiber optic cables according to the invention.

As discussed above, cable jacket 38 has a narrower waist portion compared with the end portions of fiber optic cable 30 (i.e., medial height MH is smaller than end heights EH) for inhibiting the transfer of crushing forces to optical fiber 32 when fiber optic cable is disposed within pressure clamp 19. By way of example, medial height MH is about between about 0.1 to 1.0 millimeters smaller than end height EH, and more preferably, between about 0.2 and 0.8 millimeters smaller. A height ratio is defined as the medial height to end height (MH/EH) of the fiber optic cable. Fiber optic cables according to the present invention may have a height ratio in the range of about 0.6 to about 0.9 while still working within pressure clamp 19, but the closer the range is to 1.0 the more optical performance is affected. Fiber optic cable 30 has a nominal height ratio of about 0.8 (2.5 mm/3.0 mm), but this value can vary within the range such as the height ratio being between about 0.6 (1.8 mm/3.0 mm) to about 0.9 (2.7 mm/3.0 mm). In other words, the shape of cable jacket 38 inhibits/reduces bend losses of optical fiber 32 due to crushing forces applied by pressure clamp 19. Other variations of the fiber optic cable can have a uniform thickness for the cable jacket, but these designs may not be suitable for use within pressure clamp 19 since elevated optical attenuation may occur and the optical fiber may even go "dark." More specifically, when tensioned within pressure clamp 19 the end portions (i.e., end height EH) of fiber optic cable 30 absorb the majority of the clamping forces and reduce the clamping force transferred to optical fiber 32.

Figure 4B:
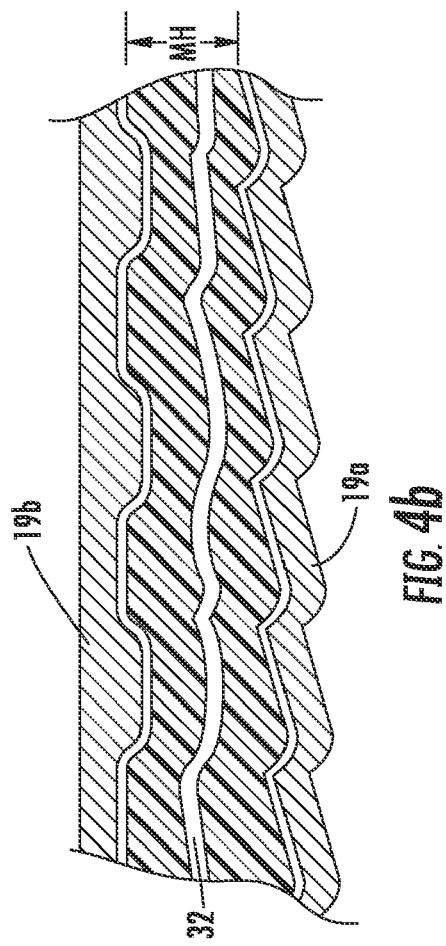
FIGS. 4a-4c depict cross-sectional views of the fiber optic cables with different height ratios disposed within the pressure clamp of FIG. 2.
Figure 4C:
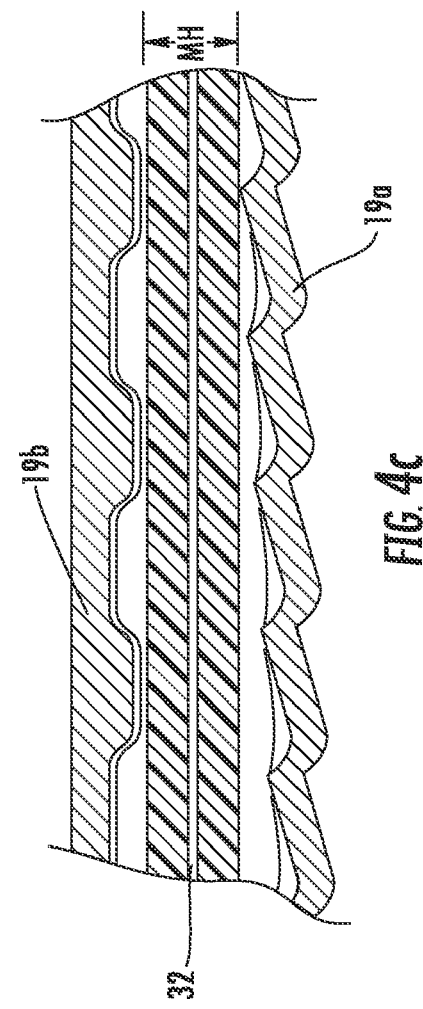
Figure 4A:
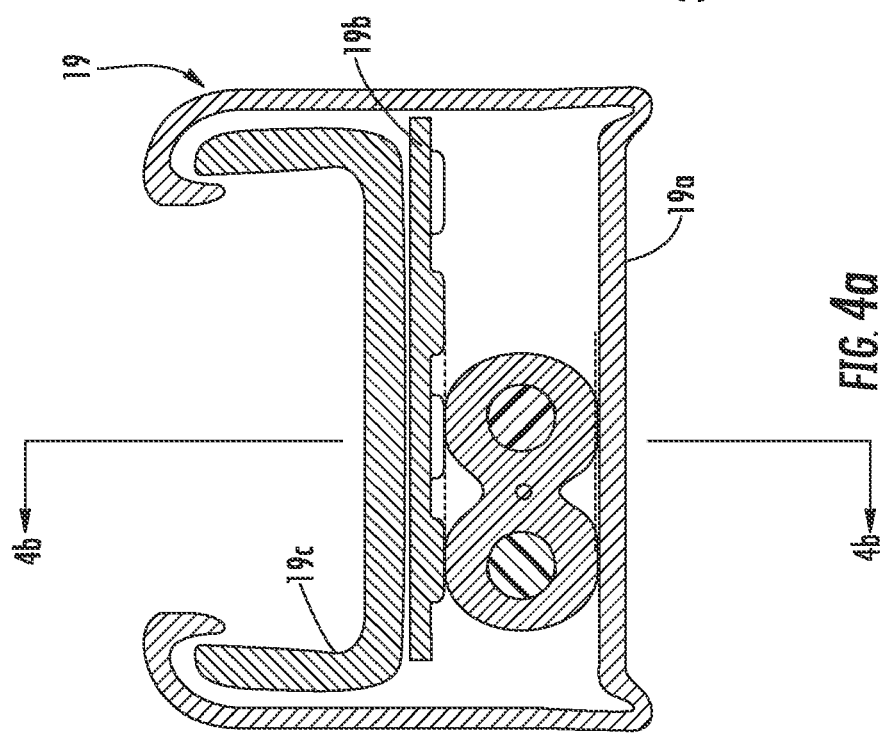

FIGS. 4a-4c show various cross-sections of fiber optic cables within pressure clamp 19 as the height ratio changes. Specifically, FIG. 4a depicts a cross-sectional view of fiber optic cables within pressure clamp 19 with wedge 19c providing clamping of the cables between grip 19b and body 19a to show the details of clamping. More specifically, FIG. 4a shows outlines of two fiber optic cables with a height ratio of 0.9 and 1.0 (e.g., the 0.9 profile is shown as a solid line and the 1.0 profile) is shown as dashed line at the medial height over optical fiber 32. A longitudinal section is taken along line b-b respectively through medial height MH of the respective fiber optic cables with two different height ratios as shown respectively in FIGS. 4b and 4c. Wedge 19c is not shown in FIGS. 4b and 4c for clarity, but pushes down on grip 19b during clamping. As shown by the detail in FIGS. 4b and 4c, grip 19b has dimples (not numbered) and body 19a has ridges (not numbered) for deforming fiber optic cable and increasing the gripping strength as the cable is being clamped therebetween. Specifically, FIG. 4b shows the longitudinal section of a fiber optic cable with a height ratio of 1.0 and the deformation of cable jacket 48 created by the dimples of grip 19b and the ridges on body 19a. FIG. 4b also shows that deformation and/or forces of pressure clamp 19 affects optical fiber 32, which affect optical performance. Conversely, FIG. 4c shows the longitudinal section of a fiber optic cable with a height ratio of 0.6 and the lack of deformation of cable jacket 48 over optical fiber 32 from the dimples of grip 19b and the ridges on body 19a, but other height ratios up to 0.9 can also benefit by preserving optical performance. Simply stated, if the height ratio is about 0.9 or less, deformation of cable jacket 38 into the optical fiber zone is reduced when disposed within pressure clamp 19. Additionally, cable jacket 38 may be formed from any suitable polymer or blends such as a polyethylene, flame-retardant polyethylene, flame-retardant PVC, PVDF, and/or other suitable materials depending on intended use of the fiber optic cable (e.g., indoor, indoor/outdoor, or outdoor).

Figure 5:
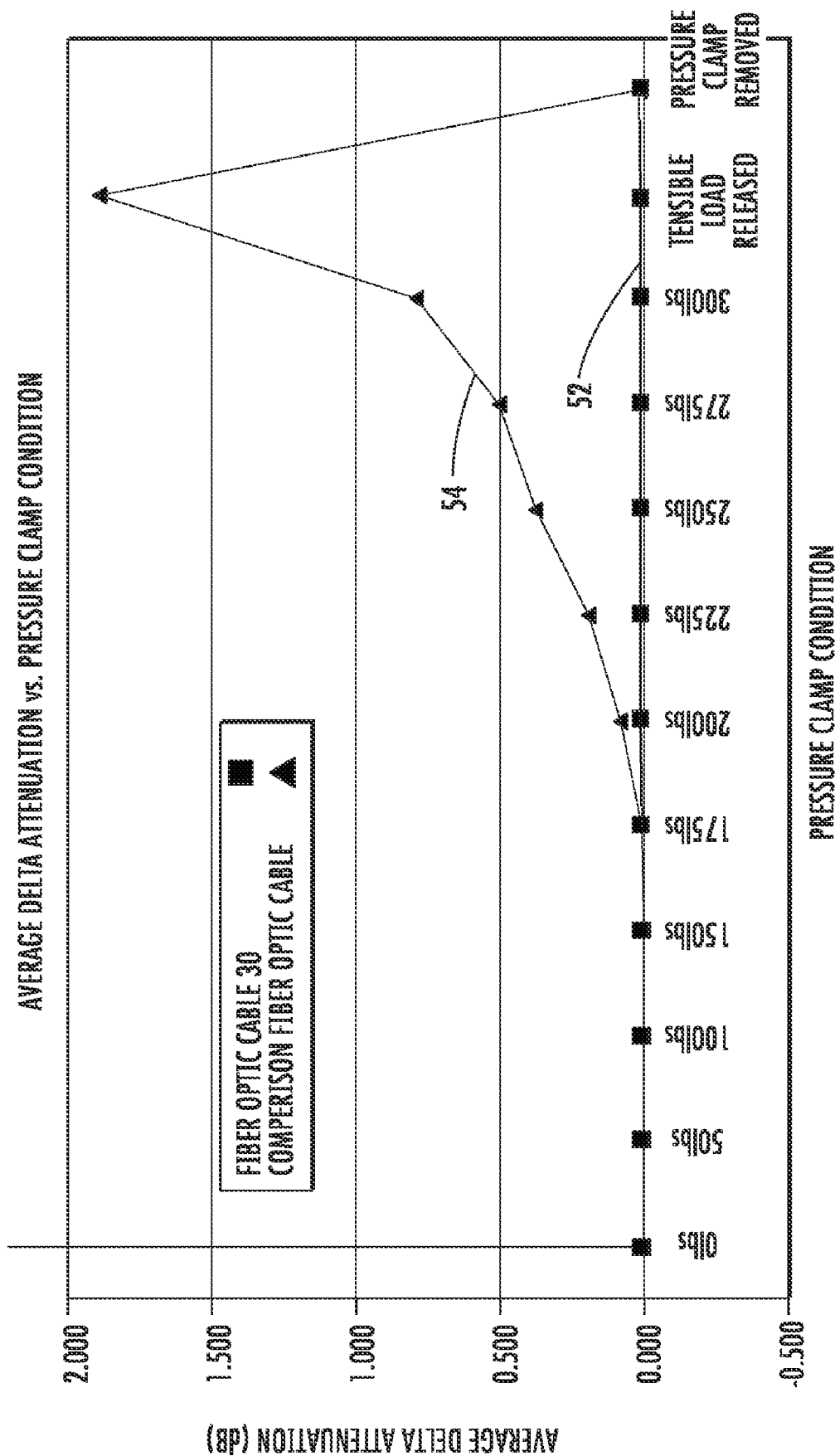
FIG. 5 is a graph depicting optical delta attenuation for the fiber optic cable of FIG. 3 along with a comparison fiber optic cable when disposed within the pressure clamp of FIG. 2 at various tensile loading conditions.

FIG. 5 illustrates a graph showing an average delta optical attenuation for fiber optic cables with different height ratios when disposed within pressure clamp 19 at a reference wavelength of 1625 nanometers for comparison purposes. Specifically, the graph illustrates the delta optical attenuation for fiber optic cable 30 (i.e., a height ratio of about 0.8) and a similar comparison fiber optic cable with the height ratio of one. More specifically, the graph depicts an average delta optical attenuation for the fiber optic cables with different height ratios in pressure clamp 19 as the tensile load on fiber optic cables is increased from 0 pounds to 300 pounds, after the tensile load is released from the respective fiber optic cables with the pressure clamp 19 still attached, and finally when pressure clamp 19 is removed from the respective fiber optic cables. The tensile load is increased up to 300 pounds to model very extreme aerial installations within the pressure clamp 19 along with heavy wind and ice loading.

A line 52 and a line 54 respectively represent an average delta optical attenuation for fiber optic cable 30 and the comparison fiber optic cable over the given tensile range and other conditions. As shown, line 52 is generally flat at around 0.02 dB, which is within the noise of the measuring equipment. For the purpose of illustration, line 52 is generally shown as being generally zero across the tensile range and other conditions. On the other hand, line 54 has a relatively low delta optical attenuation until the tensile force reaches about 175 pounds and then dramatically increases with tensile force to unacceptable levels. After the tensile force of 300 pounds is released the attenuation still increases since the pressure clamp is still clamped and the cable jacket material relaxes within pressure clamp 19. Additionally, if strength components are not bonded to the cable jacket the optical fiber will probably break as the tensile force is increased to 300 pounds. Simply stated, if strength members 34 are not bonded, then pressure clamp 19 causes cable jacket 38 to plastically deform by necking down on one side of pressure clamp 19 and accordion on the other side, resulting in catastrophic failure. However, fiber optic cable 30 is advantageous since it is robust enough to handle the extreme installation tensile loads and long spans under heavy wind and ice loads that can be experienced in aerial installations using pressure clamp 19 without undue levels of optical attenuation or catastrophic failure. By way of example, an aerial span of 150 feet of fiber optic cable 30 experiences a tensile load of about 220 pounds under NESC heavy loading (i.e., wind and ice). The relatively low tensile load under NESC heavy conditions is due to its relatively small cross-sectional footprint of fiber optic cable 30. Moreover, as shown by FIG. 5 fiber optic cable 30 can advantageously handle extreme tensile loading beyond NESC heavy loading while disposed within pressure clamp 19 (e.g., such as up to 300 pounds) without experiencing elevated levels of optical attenuation.

Additionally, since cable jacket 38 contacts optical fiber 32 a water-swellable or water-blocking component is not necessary since there are no gaps (i.e., pathways) for water to migrate along fiber optic cable 30. Stated another way, cable jacket 38 is tightly drawn onto optical fiber 32, but it does not bond to the same. It is believed that bonding of the cable jacket 38 with to optical fiber 32 is inhibited due to the relatively small amount of polymer required for the cable jacket 38 cross-section, which cools quickly during manufacturing since it has a relatively low amount of thermal energy to dissipate. Simply stated, the cross-section of fiber optic cable 30 is smaller because a buffer tube is not required for protecting the optical fiber (i.e., no buffer tube is necessary for inhibiting crushing forces and/or inhibiting sticking of the optical fiber to the cable jacket). The relatively small amount of polymer for cable jacket 38 can be quantified using a cable jacket envelope to strength component or member area ratio. The cable jacket envelope to strength component is defined as the total area of the cable jacket envelope (minus the area for the strength component(s)) to the total area for all of the strength components. For instance, the cable jacket envelope to strength component area ratio of fiber optic cable 30 is about 4.5:1, whereas the ratio for the conventional fiber optic cable of FIG. 4 is about 5.5:1. Size variations of fiber optic cable 30 can alter the ratio to about 5:1 or less.

Optical fiber 32 should provide the desired performance for the intended application. For instance, if the cable is intended for aerial applications, then the optical fiber 32 within fiber optic cable 30 should have an delta optical attenuation of about 0.3 dB or less when disposed in pressure clamp 19 with a tensile load of 300 pounds and preferably about 0.1 dB or less. Likewise, if the fiber optic cable has strength components with shape memory and is intended to be wrapped about structures for tie-down, then optical fiber 32 should be a bend resistant optical fiber to accommodate small bend diameters as known in the art. Additionally, if desired optical fiber 32 may include an optional coating 33 that becomes part of the optical fiber to improve the handlability by the craft and/or robustness. By way of example, coating 33 can be any suitable material such as a UV-curable upcoating disposed on the optical fiber such as up to 500 microns or other desired size like 900 microns, but other sizes are possible like 700 microns. Polymer coatings such as a PVC, PVDF, or the like are also possible, but bonding between the polymer coating and cable jacket 38 should be avoided to preserve optical attenuation. Optical fiber 32 has a relatively low excess fiber length (EFL) such as 0.1% or less since cable jacket 38 contacts the same and higher levels of EFL can cause elevated optical attenuation levels. Additionally, optical fiber 32 may be proof tested to higher strength levels than normal (e.g., over 100 KPSI) such as proof tested to 200 KPSI or other suitable value for making the fiber optic cable compliant with GR-20 optical fiber strain requirements.

Figure 6:
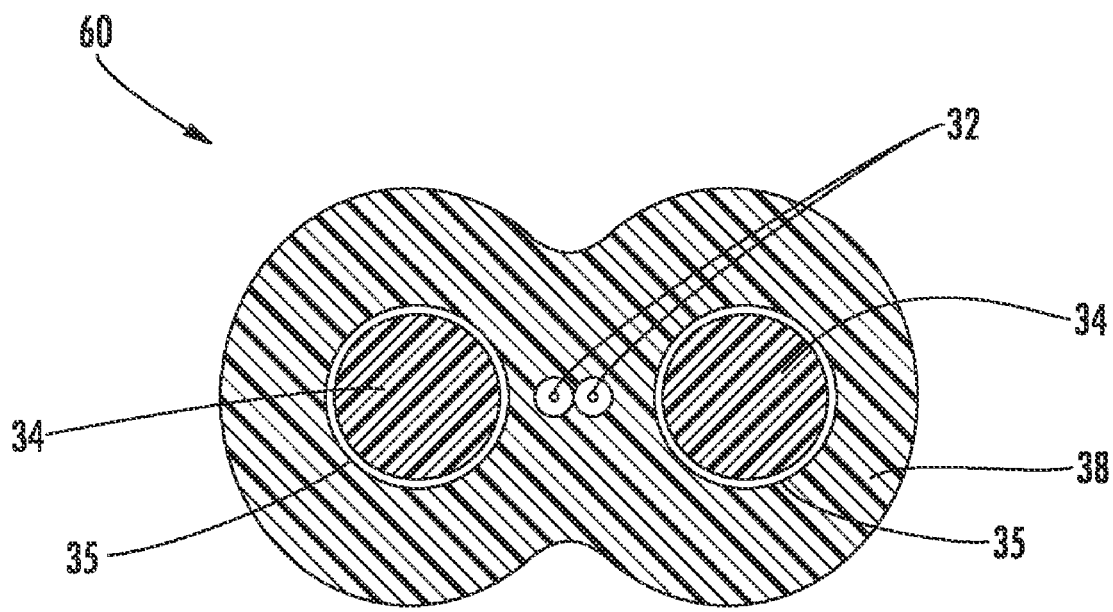
FIGS. 6 and 7 are cross-sectional views of fiber optic cables having multiple optical fibers according to the present invention.
Figure 7:
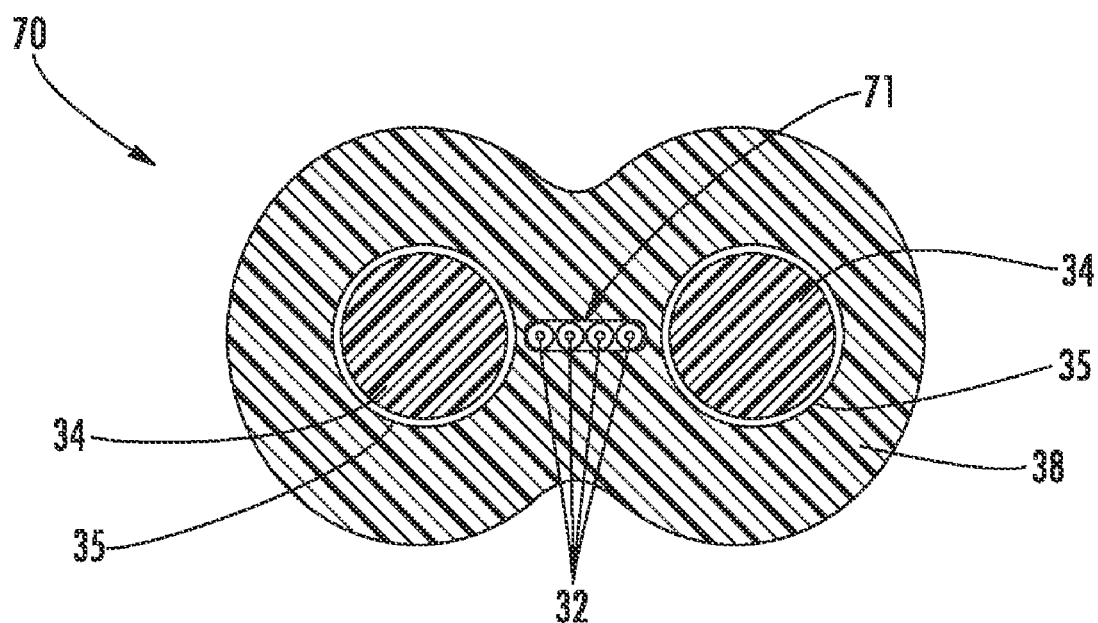

Fiber optic cable designs according to the concepts of the present invention can have any suitable number of optical fibers therein in a bare, colored, coated, or ribbonized format. FIGS. 6 and 7 respectively are cross-sectional views of a fiber optic cable 60 and a fiber optic cable 70 according to the present invention that are similar to fiber optic cable 30, but the fiber optic cables include multiple optical fibers 32. As shown fiber optic cable 60 includes two bare optical fibers 32 disposed between strength members 34, thereby forming a multi-fiber version of the fiber optic cable. Other structures are also possible such as using optical fiber ribbons for creating multi-fiber cable variations. Illustratively, fiber optic cable 70 depicts a fiber optic ribbon 71 having four optical fibers 32 therein.

Figure 8:
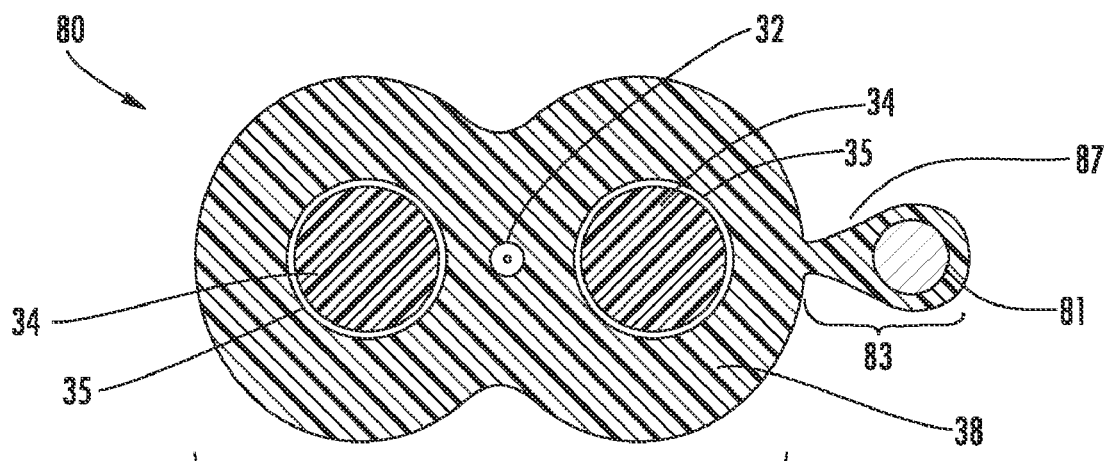
FIGS. 8-10 depict cross-sectional views of fiber optic cables similar to the fiber optic cable 30 having a tonable element according to the present invention.
Figure 9:
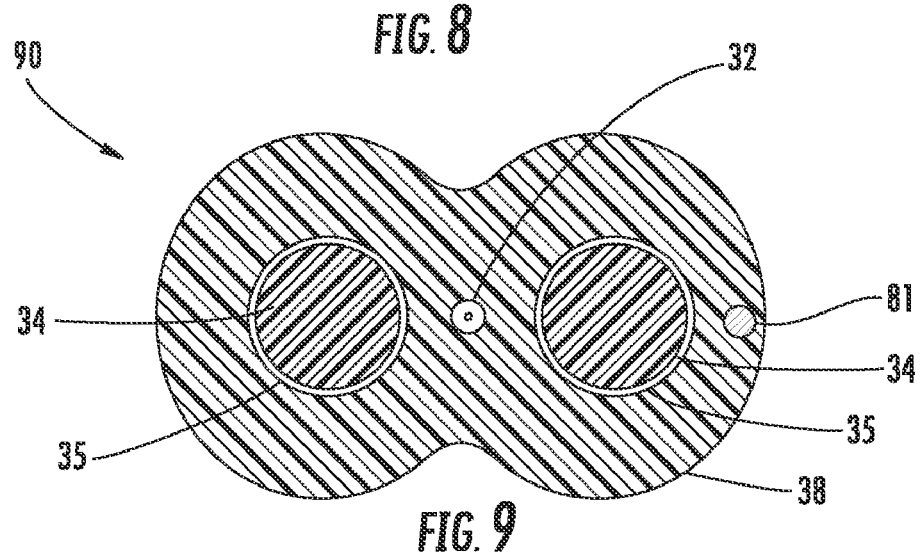
Figure 10:
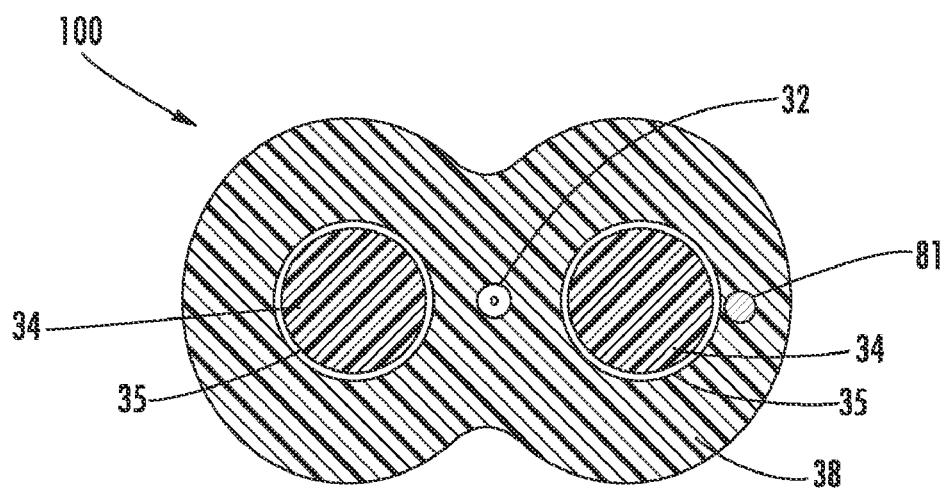

Additionally, tonable variations similar to fiber optic cable 30 are possible according to the concepts of the present invention such as shown in FIGS. 8-10. Specifically, fiber optic cables according to the present invention can include a tonable element 81 such as a conductive wire, strip, or the like for locating the fiber optic cable such as when it is buried so it can be located and/or marked to prevent inadvertent damage. Tonable element 81 may be any suitable conductive material useful for determining the location of the fiber optic cable such as a small copper wire, copper-clad steel, or the like. By way of example, tonable element 81 is a copper wire having a gauge between 20-42 AWG. For instance, FIG. 8 depicts a fiber optic cable 80 having a tonable element 81 disposed within a tonable lobe 83 that is separable from a main cable body 85. Specifically, tonable lobe 83 is attached to main cable body 85 by a web 87 that is easily separable by hand, thereby making it craft-friendly. Web 87 can also include a preferential tear portion/geometry (not numbered) for controlling the location of the tear in the web near main cable body 85, thereby resulting in a "clean" separation. Main cable body 85 and tonable lobe 83 are typically extruded using the same extrusion tooling. Other variations locate tonable element 81 within the main cable body. By way of example, fiber optic cable 90 includes tonable element 81 disposed within cable jacket 38 at a location near the outer surface of the same, thereby making accessing tonable element 81 relatively easy. Fiber optic cable 100 shows another variation where tonable element is disposed within cable jacket 38, but disposed adjacent to one of the strength members 34. Fiber optic cables 90 and 100 may also include marking indicia for indicating which side of the cable includes the tonable element 81. In other variations, tonable element 81 can be disposed within one of the strength members or the strength component could be a tonable element.

Figure 11C:
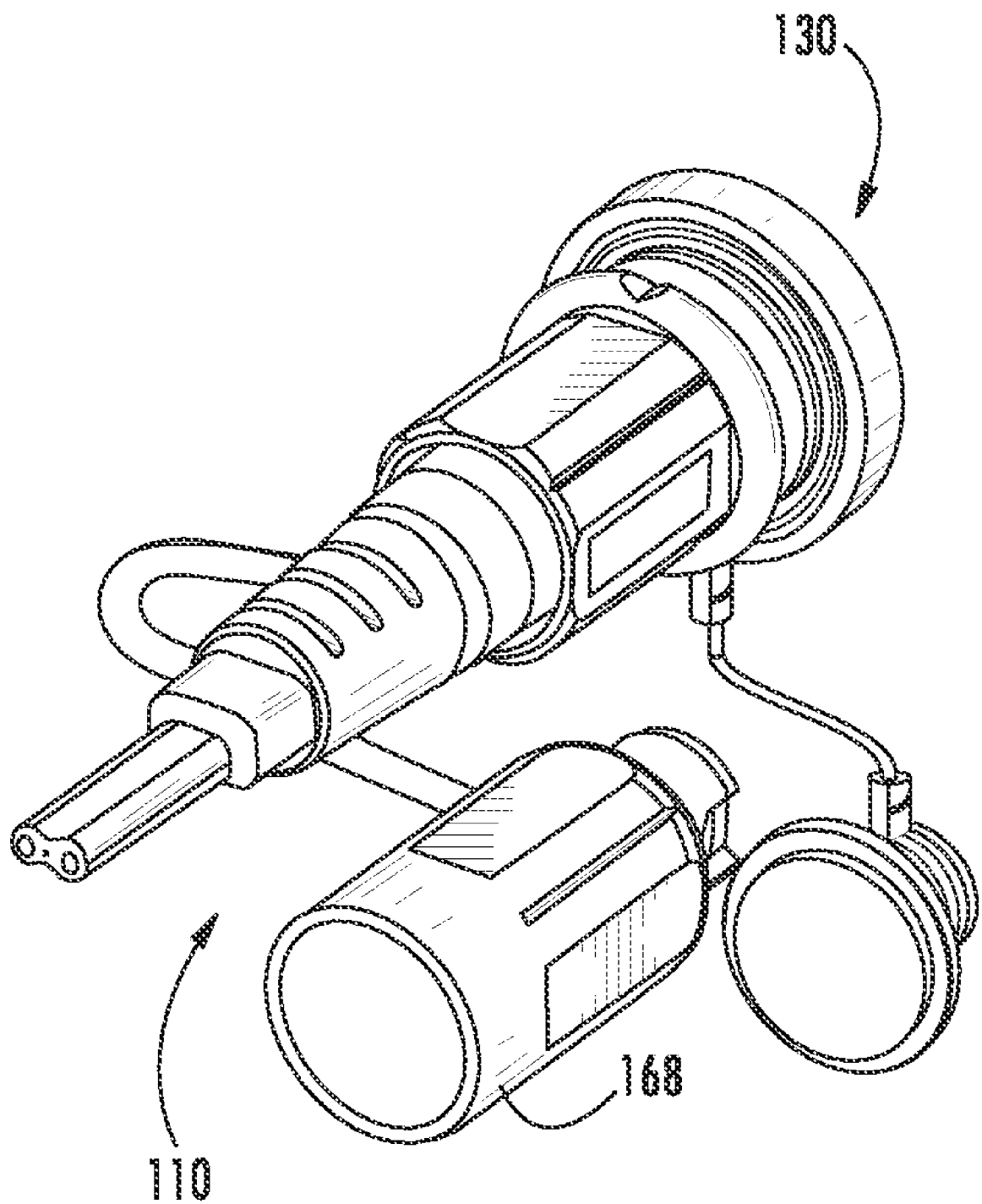

Fiber optic cables of the present invention can be preconnectorized in the field or the factory on one or more ends with a hardened optic connector, thereby making a preconnectorized fiber optic cable or assembly suitable for plug and play connectivity by the craft. As used herein, a hardened connector refers to a robust fiber optic connector that is weatherproof, thereby making it suitable for use in the outside plant environment, but it is possible to use the hardened connector indoors. For instance, the craft may route the preconnectorized fiber optic cable having the hardened connector to a premises, a multi-port device, a network interface device (NID), optical network terminal (ONT), a closure, or the like. FIGS. 11a-11c show an exemplary fiber optic mating assembly during the various stages of mating of an end of a preconnectorized fiber optic cable.

More specifically, FIGS. 11a-11c depict a preconnectorized fiber optic cable 110 (i.e., the assembly includes fiber optic cable 30 with one or more hardened connectors 150) being mated with a complementary receptacle 130. Specifically, FIG. 11a shows receptacle 130 detached from preconnectorized fiber optic cable 110. Moreover, preconnectorized fiber optic cable 110 and receptacle 130 are depicted with their respective protective caps on. Protective cap 168 is used for shielding a connector assembly 152 (FIG. 13), and in particular, the end face of a connector ferrule 152b of the hardened connector from the elements and/or damage. Specifically, installed protective cap 168 isolates connector ferrule 152b from the elements and prevents it from being damaged during transportation and handling. FIG. 11b shows protective cap 168 removed from the end of preconnectorized fiber optic cable 110. Likewise, the respective cap (not numbered) of receptacle 130 is also removed. Preconnectorized fiber optic cable 110 is positioned to engage the complimentary portions of receptacle 130. Specifically, an alignment indicia 160c of preconnectorized fiber optic cable 110 is positioned to its complementary indicia 130c of receptacle 130. FIG. 11c shows a mated connection between the preconnectorized fiber optic cable 110 and receptacle 130, thereby making an optical connection therebetween. As readily apparent, no special equipment, training, or skill is required to make the optical connection. Thus, the labor cost of deploying the optical network to the premises, or other location, is cost effective and efficient. In this case, the mating between the hardened connector (i.e., the plug connector) and the receptacle is secured using a threaded engagement, but other suitable means of securing the optical connection are possible. For instance, the securing means may use a quarter-turn lock, a quick release, a push-pull latch, or a bayonet configuration.

Figure 12:
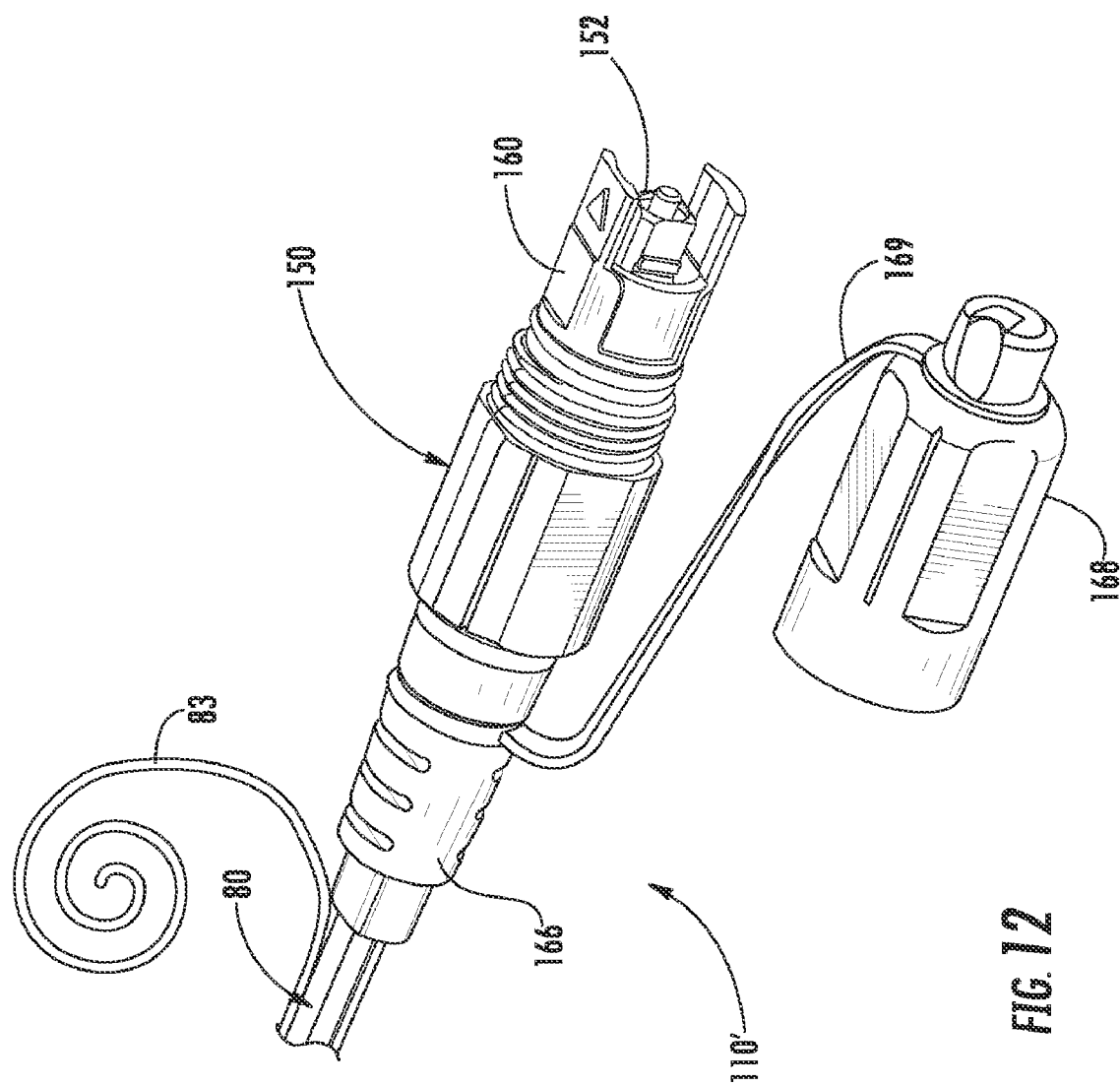
FIG. 12 is an assembled perspective view of a preconnectorized fiber optic cable using the fiber optic cable of FIG. 8 according to the present invention.

FIG. 12 depicts a perspective view of an assembled preconnectorized fiber optic cable 110' with a toning element 81. Specifically, preconnectorized fiber optic cable 110' is an assembly that includes fiber optic cable 80 with a hardened connector 150 (i.e., optical plug connector) mounted upon one end of fiber optic cable 80. Recall that fiber optic cable 80 has toning element 81 disposed within tonable lobe 83 that is connected by a web portion 87 to the main cable body 85. As shown, a portion of tonable lobe 83 is separated from main cable body 85 and coiled before attaching hardened connector 150, thereby keeping it out of way and allowing grounding of tonable element 81 if necessary. Hardened connector 150 uses a connector assembly 152 of the SC type, but other types of connector assemblies such as LC, FC, ST, MT, and MT-RJ are contemplated by the present invention by using a suitable crimp housing. Thus, suitable hardened connectors may be used with suitable cables according to the concepts of the present invention, thereby resulting in numerous fiber optic cable/hardened connector assembly combinations.

Figure 13:
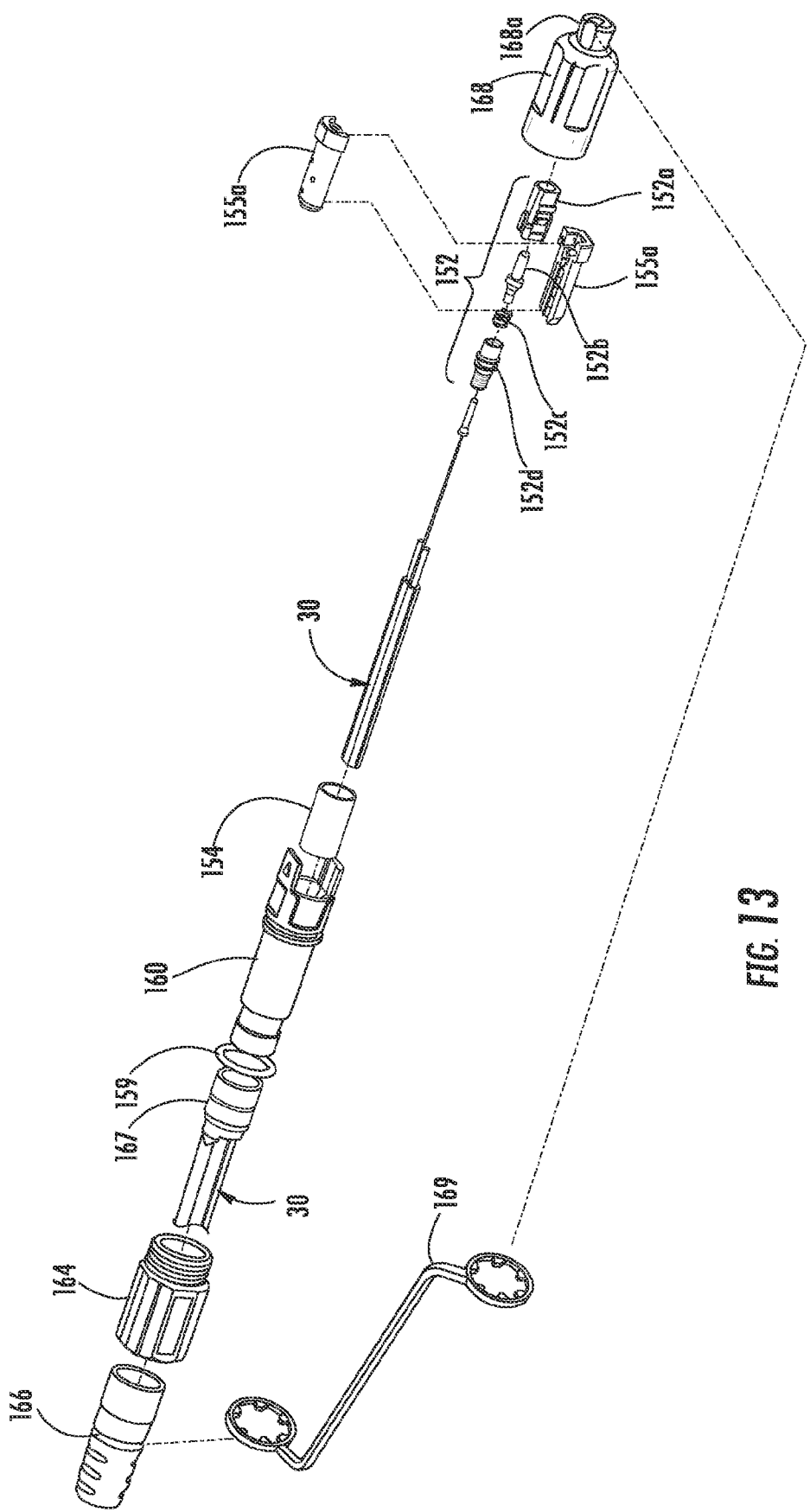
FIG. 13 is a partially exploded view of the preconnectorized fiber optic cable of FIG. 11a according to the present invention.

FIG. 13 depicts a partially exploded view of preconnectorized fiber optic cable 110 showing the components of hardened connector 150. As shown, hardened connector 150 includes an industry standard SC type connector assembly 152 having a connector body 152a, a ferrule 152b in a ferrule holder (not numbered), a spring 152c, and a spring push 152d. Hardened connector 150 also includes a crimp assembly (not numbered) that includes a crimp housing 155 having at least one shell 155a and a crimp band 154, a shroud 160 (FIGS. 14a and 14b) that receives one or more O-rings 159, a coupling nut 164, a cable boot 166, a heat shrink tube 167, and protective cap 168 secured to boot 166 or other suitable portion of the assembly by a lanyard 169.

Generally speaking, most of the components of hardened connector 150 are formed from a suitable polymer. By way of example, the polymer is a UV stabilized polymer such as ULTEM 2210 available from GE Plastics; however, other suitable materials are possible. For instance, stainless steel or any other suitable metal may be used for various components.

Figure 15B:
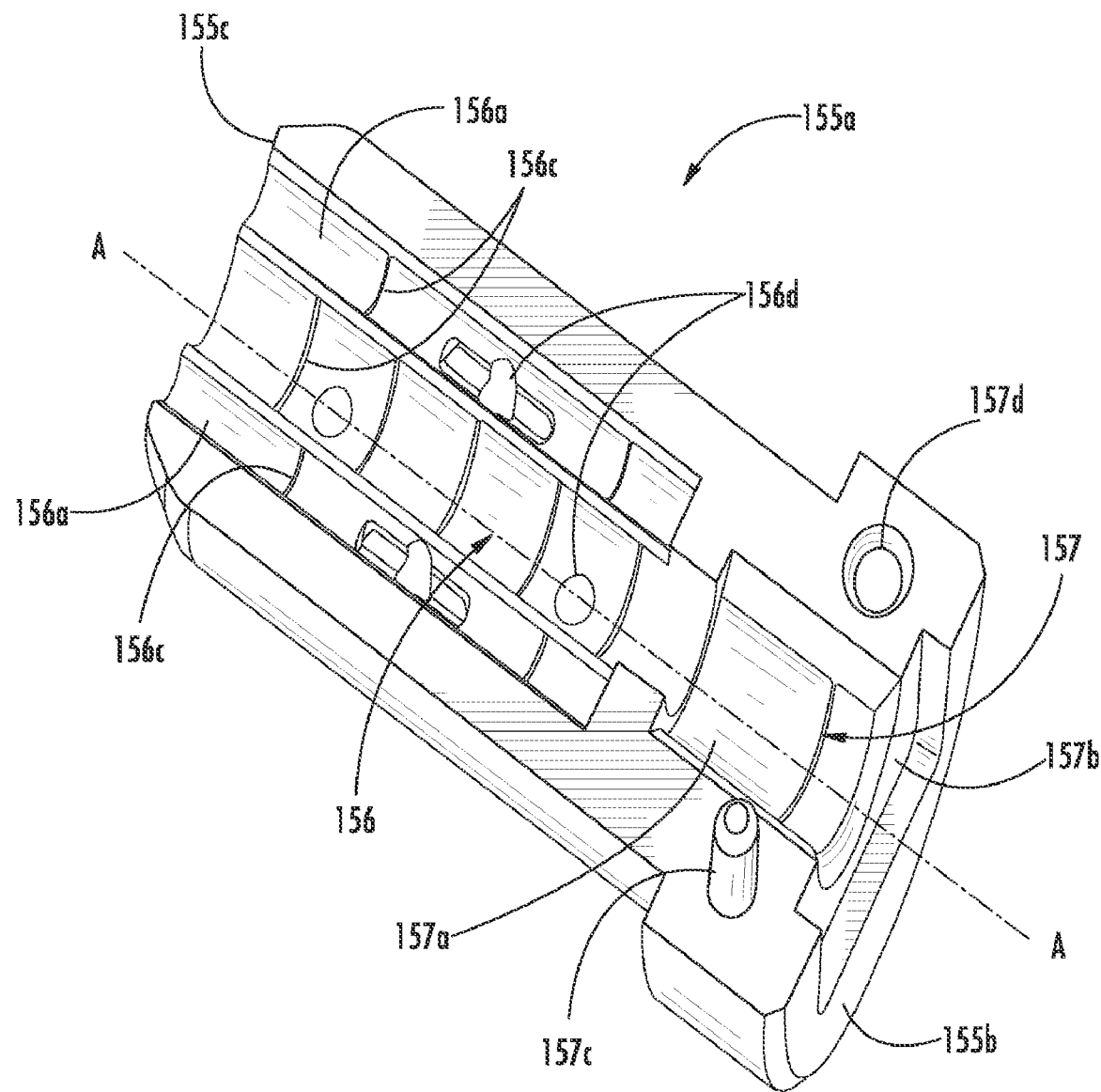
FIG. 15b is a perspective view of one shell of the crimp housing of the hardened connector of FIG. 13.
Figure 15D:
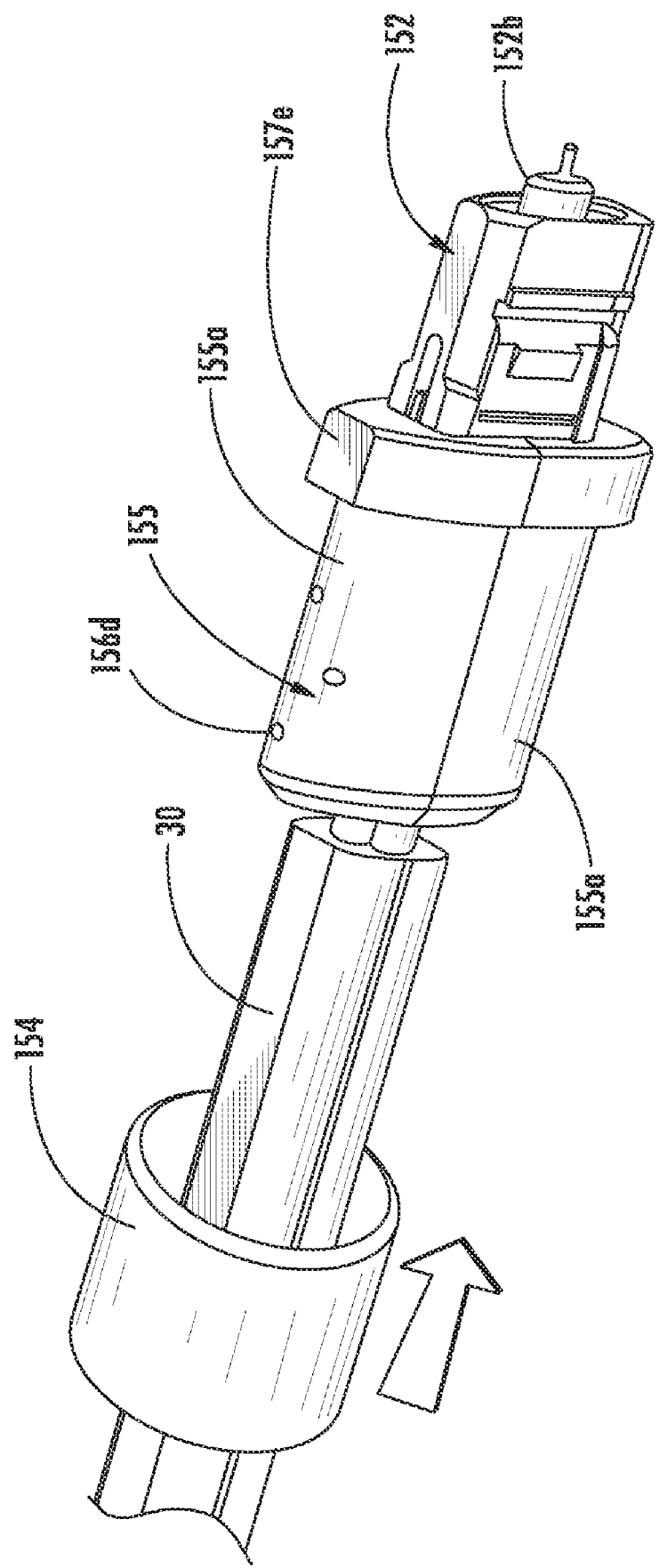
FIG. 15d shows another partially assembled view of the preconnectorized fiber optic cable of FIG. 13 where the crimp band is being slid into position onto the crimp housing.

As best shown in FIG. 15d, the crimp assembly includes crimp housing 155 and crimp band 154. Crimp housing 155 has two shells 155a that are held together by crimp band 154 when the preconnectorized fiber optic cable is assembled. Although, two identical shells are shown, it is to be understood that other suitable shell configurations are possible such as shells that are greater than or less than half of the crimp housing or more than two shells. Crimp band 154 is preferably made from brass, but other suitable crimpable materials may be used. Crimp housing 155 is configured for securing connector assembly 152 as well as providing strain relief to fiber optic cable 30 by securing one or more strength members 34. Additionally, an epoxy, adhesive, glue, or the like may be used for securing strength members 34 within crimp housing 155. This advantageously results in a relatively compact connector arrangement using fewer components. Moreover, the crimp assembly allows preconnectorized fiber cable 110 to be assembled quickly and easily. Of course, other embodiments are possible according to the present invention. For instance, connector body 152a may be integrally molded into crimp housing 155 in a ST type configuration so that a twisting motion of the crimp housing secures the ST-type connector with a complementary mating receptacle.

FIGS. 15a-15d depict several steps during the process of attaching the crimp assembly 155 to fiber optic cable 30. FIG. 15a shows fiber optic cable 30 with strength members 34 and optical component 42 extending from the end of fiber optic cable 30. Preparing the end of fiber optic cable 30 is relatively easy since a cutting blade can be run adjacent to strength members 34 at the top and bottom removing portion of cable jacket 38 and then strength members 34 can be pulled apart leaving optical fiber(s) 32 encased in a portion of cable jacket 38 to provide protection the same for routing and the like. Thereafter, the remainder of cable jacket 38 on strength members 34 can be easily removed along with the desired length of remaining cable jacket 38 on optical fiber(s) 32. FIG. 15b shows the inner surface of one shell 155a. In this case, only one shell 155a is illustrated since two symmetrical shells are used for crimp housing 155. In other embodiments there may be a first shell and a second shell, which are different. For instance, one shell may have two alignment pins, rather than each half-shell having a single alignment pin or one shell may be less than half of crimp housing 155.

As shown in FIG. 15b, shell 155a includes a first end 155b for securing connector assembly 152 and a second end 155c that provides strain relief by securing one or more strength members 34. A longitudinal axis A-A is formed between first end 155b and second end 155c of shell 155a near the center of crimp housing 155, through which half of a longitudinal passage is formed. When assembled, optical fiber(s) 32 passes through the longitudinal passage and is held in a bore of ferrule 152b. Additionally, shell 155a includes a cable clamping portion 156 and a connector assembly clamping portion 157.

Specifically, cable clamping portion 156 has two outboard half-pipe passageways 156a and a central half-pipe passageway 156b that is generally disposed along longitudinal axis A-A. Half-pipe passageways 156a may include at least one rib 156c for securely clamping strength members 34 and may further include injecting an epoxy, adhesive, glue, or the like into the cable clamping portions, then crimp band 154 is crimped, thereby completing the crimp assembly. Moreover, half-pipe passageways 156a are sized for the components of fiber optic cable 30 such as strength components 34 and optical fiber(s) 32, but the passageways can be sized for different cable configurations.

Likewise, shell 155a has a connector assembly clamping portion 157 that is sized for attaching connector assembly 152. Specifically, connector assembly clamping portion 157 has a half-pipe passageway 157a that opens into and connects central half-pipe passageway 156b and a partially rectangular passageway 157b. Half-pipe passageway 157a is sized for securing spring push 152d and may include one or more ribs for that purpose. Rectangular passageway 157b holds/secures a portion of connector body 152a therein and inhibits the excess rotation between connector assembly 152 and the crimp housing 155. FIG. 15c depicts prepared fiber optic cable 30 of FIG. 15a having connector assembly 152 attached and positioned in a first shell 155a. The alignment of the two shells is accomplished by inserting pins 157c into complementary bores 157d of the two shells. FIG. 15d shows both half-shells 155a of crimp housing 155 disposed about fiber optic cable 30 before crimp band 154 is installed thereover. Additionally, shells may include one or more bores 156d that lead to one of half-pipe passageways 156a or 156b. Bores 156d allow for inserting an epoxy, adhesive, glue, or the like into the crimp housing 155, thereby providing a secure connection for strain relief.

As shown in FIG. 12, when fully assembled at least a portion of the crimp assembly fits into shroud 160. Additionally, crimp housing 155 is keyed to direct the insertion of the crimp housing/crimp assembly into shroud 160. In this case, shells 155a include planar surfaces 157e (FIG. 15d) on opposites sides of crimp housing 155 to inhibit relative rotation between crimp housing 155 and shroud 160. In other embodiments, the crimp assembly may be keyed to the shroud using other configurations such as a complementary protrusion/groove or the like.

As best shown in FIGS. 14a and 14b, shroud 160 has a generally hollow cylindrical shape with a first end 160a and a second end 160b. Shroud 160 generally protects connector assembly 152 and may also key hardened connector 150 with the respective mating receptacle 130. Shroud 160 includes a through passageway between first and second ends 160a and 160b for receiving a portion of the crimp housing. As discussed, the passageway of shroud 160 is keyed so that crimp housing 154 is inhibited from excess rotation when hardened connector 150 is assembled. Additionally, the passageway has an internal shoulder (not visible) that inhibits the crimp assembly from being inserted beyond a predetermined position.

Additionally, first end 160a of shroud 160 includes at least one opening (not numbered) defined by shroud 160. The at least one opening extends from a medial portion of shroud 160 to first end 160a. More specifically, shroud 160 includes a pair of openings on opposite sides of first end 160a, thereby defining alignment portions or fingers 161a, 161b. In addition to aligning shroud 160 with receptacle during mating, alignment fingers 161a, 161b may extend slightly beyond connector assembly 152, thereby protecting the same. As shown in FIG. 14b, alignment fingers 161a, 161b have different shapes so hardened connector 150 and receptacle 130 only mate in one orientation. This orientation can be marked on shroud 160 using alignment indicia 160c so that the craftsman can quickly and easily mate preconnectorized fiber optic cable 110 with receptacle 130. In this case, alignment indicia 160c is an arrow molded into the top alignment finger of shroud 160, however, other suitable indicia may be used. As shown, the arrow is aligned with complimentary alignment indicia 130c disposed on receptacle 30 (FIG. 11b), thereby allowing the craftsman to align indicia 160c, 130c so that alignment fingers 161a, 161b can be seated into receptacle 130. Thereafter, the craftsman engages the external threads of coupling nut 164 with the complimentary internal threads of receptacle 130 to make the optical connection as shown in FIG. 11c.

A medial portion of shroud 160 has one or more grooves 162 for seating one or more O-rings 159. O-ring 159 provides a weatherproof seal between hardened connector 150 and receptacle 130 or protective cap 168. The medial portion also includes a shoulder 160d that provides a stop for coupling nut 164. Coupling nut 164 has a passageway sized so that it fits over the second end 160b of shroud 160 and easily rotates about the medial portion of shroud 160. In other words, coupling nut 164 cannot move beyond shoulder 160d, but coupling nut 164 is able to rotate with respect to shroud 160. Second end 160b of shroud 160 includes a stepped down portion having a relatively wide groove (not numbered). This stepped down portion and groove are used for securing heat shrink tubing 167. Heat shrink tubing 167 is used for weatherproofing the preconnectorized fiber optic cable. Specifically, the stepped down portion and groove allow for the attachment of heat shrink tubing 167 to the second end 160b of shroud 160. The other end of heat shrink tubing 167 is attached to cable jacket 38, thereby inhibiting water from entering hardened connector 150.

After the heat shrink tubing 167 is attached, boot 166 is slid over heat shrink tubing 167 and a portion of shroud 160. Boot 166 is preferably formed from a flexible material such as KRAYTON, but other materials and/or configurations are possible. Heat shrink tubing 167 and boot 166 generally inhibit kinking and provide bending strain relief to fiber optic cable 30 near hardened connector 150. Boot 166 has a longitudinal passageway (not visible) with a stepped profile therethrough. The first end of the boot passageway is sized to fit over the second end of shroud 160 and heat shrink tubing 167. The first end of the boot passageway has a stepped down portion sized for fiber optic cable 30 and the heat shrink tubing 167 and acts as stop for indicating that the boot is fully seated. After 1 boot 66 is seated, coupling nut 164 is slid up to shoulder 160c so that lanyard 169 can be secured to boot 166. Specifically, a first end of lanyard 169 is positioned about groove 166a on boot 166. Thus, coupling nut 164 is captured between shoulder 160c of shroud 160 and lanyard 169 on boot 166. This advantageously keeps coupling nut 164 in place by preventing it from sliding past lanyard 169 down onto fiber optic cable 30.

A second end of lanyard 169 is secured to protective cap 168 using a snap-fit into a groove (not numbered) on a front end of protective cap 168. Consequently, protective cap 168 is prevented from being lost or separated from preconnectorized fiber optic cable 110. Additionally, protective cap 168 can also include at an eyelet 168a. Eyelet 168a is useful for attaching a fish-tape or other pulling device so that preconnectorized fiber optic cable 110 can be pulled through a duct or the like. Protective cap 168 has internal threads for engaging the external threads of coupling nut 164 to secure it in place when not making an optical connection. Moreover, one or more O-rings 159 provide a weatherproof seal between hardened connector 150 and protective cap 168 when installed. When threadly engaged, protective cap 168 and coupling nut 164 of the hardened connector may rotate with respect to the remainder of preconnectorized fiber optic cable 110, thereby inhibiting torsional forces during pulling of the same.

Preconnectorized fiber optic cable 110 may have any suitable length desired, however, preconnectorized fiber optic cable 110 can have standardized lengths. Moreover, preconnectorized fiber optic cable 110 may include a length marking indicia for identifying its length. For instance, the length marking indicia may be a marking located on the cable such as a colored stripe or denoted in a print statement. Likewise, the length marking indicia may be a marking located on hardened connector 150. In one embodiment, length marking indicia may be denoted by a marking on coupling nut 164 or protective cap 168 such as a colored stripe. In any event, the length marking indicia should be easily visible so the craftsperson may identify the preconnectorized fiber cable length. By way of example, a red marking indicia on coupling nut 164 denotes a length of about 150 feet while an orange marking indicia denotes a length of about 300 feet.

The described explanatory embodiment provides an optical connection between the hardened connector 150 and its complementary receptacle 130 that can be made in the field without any special tools, equipment, or training. Additionally, the optical connection is easily connected or disconnected by merely mating or unmating the ends of preconnectorized fiber optic cable 110 with the respective receptacle by threadly engaging or disengaging coupling nut 164 and pulling hardened connector 150 from the complementary receptacle 130. Thus, the preconnectorized fiber optic cables of the present invention allow deployment of optical waveguides toward the subscriber or other location in an easy and economical manner, thereby providing the end user with increased bandwidth. Furthermore, the concepts of the present invention can be practiced with other hardened connectors and/or other preconnectorized fiber optic cable configurations.

Figure 16:
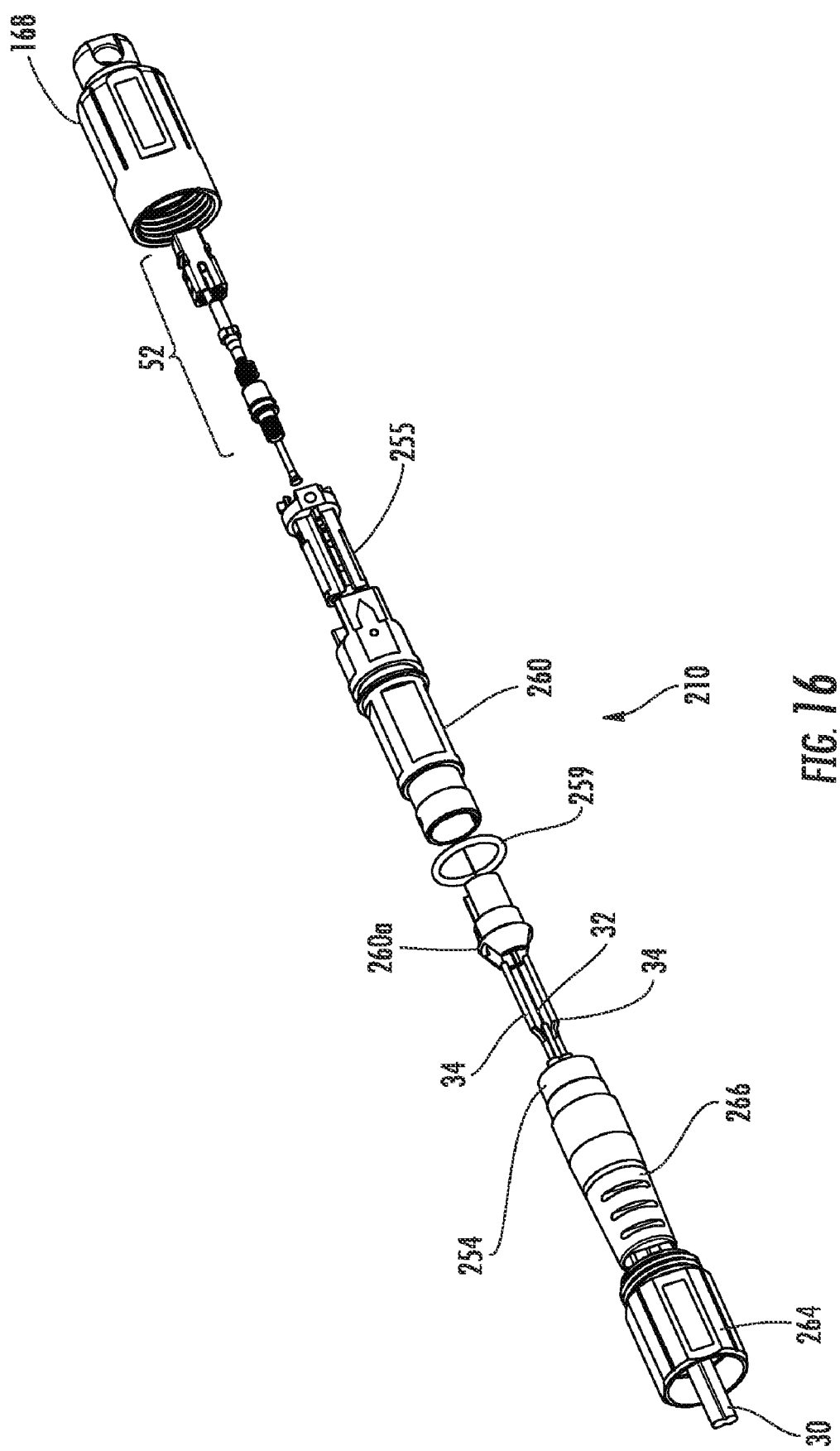
FIG. 16 is an exploded view of another preconnectorized fiber optic cable using a different hardened connector according to the present invention.

For instance, FIG. 16 depicts an exploded view of another preconnectorized fiber optic cable 210 according to the present invention using a hardened connector 250 attached to fiber optic cable 30 that is similar to hardened connector 150. In other words, hardened connector 250 is suitable for mating with complementary receptacle 130 like hardened connector 150, but uses a different structure for securing fiber optic cable 30 and connector assembly 52. Hardened connector 250 also includes a retention body 255, a shroud 260 that receives one or more O-rings 259, an optional shroud end piece 260a, a coupling nut 264, a cable boot 266, a heat shrink tube 254, and protective cap 268 secured to boot 266 or other suitable portion of the assembly by a lanyard 269.

Fiber optic cable 30 is prepared for connectorization with hardened connector 150 in a manner similar to that shown in FIG. 15a. The exposed strength members 34 of fiber optic cable are secured to retention body 255. Retention body 255 includes a central bore (not visible) for passing optical fiber 32 of fiber optic cable 30 therethrough for insertion into the ferrule of connector assembly 152. Additionally, retention body 255 has two bores disposed outboard of the central bore sized for receiving strength members 34 therein. One method for securing strength members 34 to retention body 255 uses a radiation curable, heat curable epoxy, adhesive, glue, or the like for securing the same. If a radiation curable substance is used such as a light or UV curable epoxy, then retention body should be translucent for allowing the radiation for curing to reach and cure the radiation curable substance in a suitable manner. The front end of retention body 255 is used for securing connector assembly 152 thereto. Specifically, connector assembly 152 snap-fits to retention body 255 using resilient fingers or the like, but other suitable structures are possible for securing connector assembly 152 to retention body. Additionally, connector assembly 152 may be secured to retention body 255 in a manner that allows for some rotational movement. Thereafter, the retention body 255 assembly at least partially fits within shroud 260 and is keyed to shroud 260 inhibit rotation therebetween. The other components of hardened connector 250 are similar to hardened connector 150.

As shown, retention body 255 is a monolithic structure, but it may have a structure that includes more that one piece. For instance, strength members 34 could have a mechanical attachment to retention body 255 instead of using an epoxy, adhesive, glue, or the like for securing the same. Specifically, retention body 255 can have wedges (i.e., one-way grips like a Chinese finger toy) that secure strength members 34 as they are inserted into the same. Hardened connector 150 is also suitable for use with automated assembly techniques.

Figure 17:
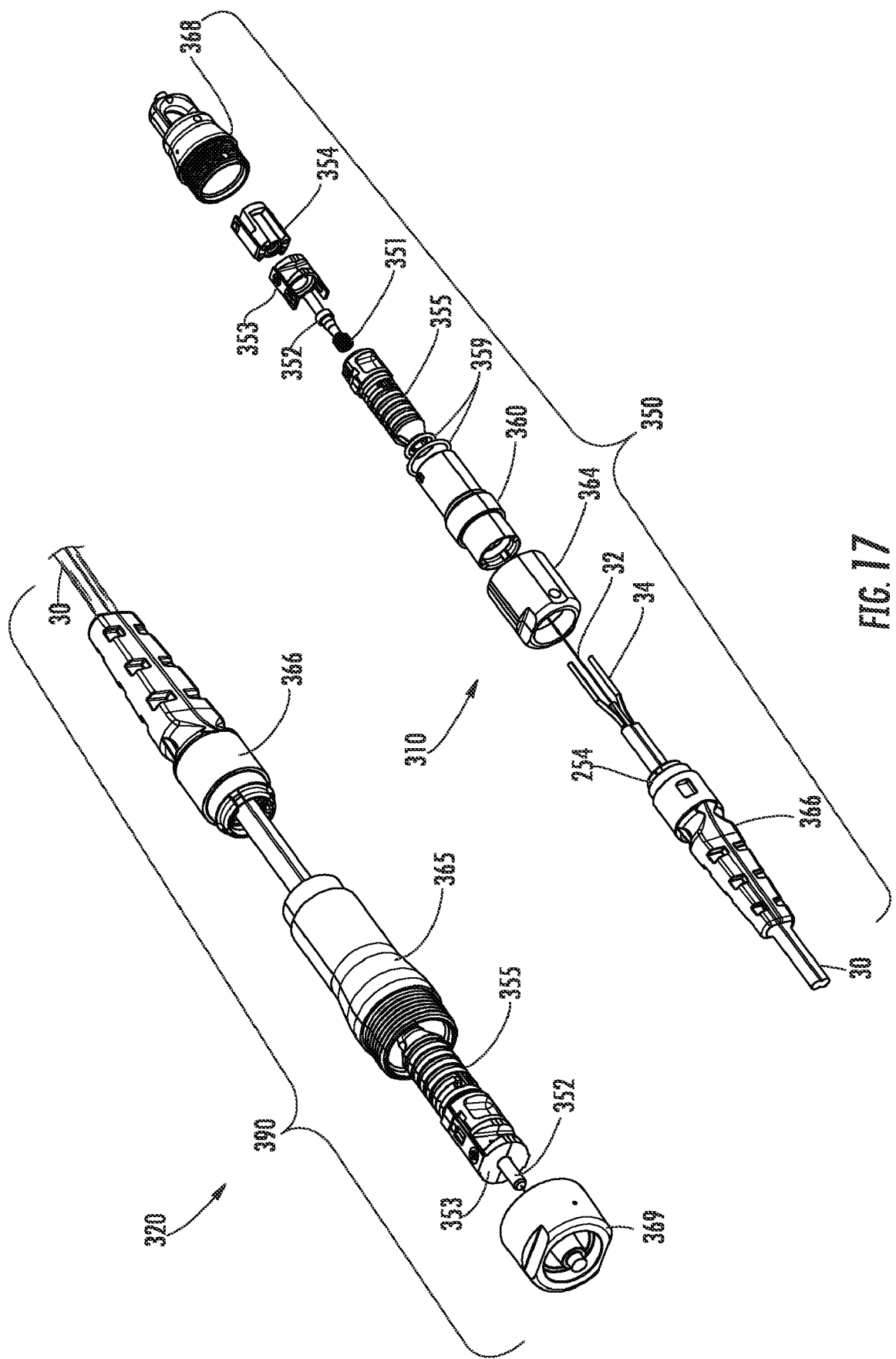
FIG. 17 depicts partially exploded views of two preconnectorized fiber optic cables each having a complementary hardened connector according to the present invention.

Other hardened connectors can be used with the fiber optic cables of the present invention. FIG. 17 illustrates complementary preconnectorized fiber optic cables 310 and 320 that are suitable for mating together. Specifically, FIG. 17 shows a partially exploded view of a preconnectorized fiber optic cable 310 using a hardened connector 350 on a first fiber optic cable 30 along with a partially exploded view of its complementary preconnectorized fiber optic cable 320 having hardened connector 390 on a second fiber optic cable 30. Hardened connector 350 and 390 are similar hardened connectors (i.e., some components are the same or similar thereby reducing complexity) that are intended to have opposing ferrules mate through an alignment sleeve 354 that is a portion of hardened connector 350, instead of mating with a complementary receptacle like hardened connectors 150 and 250. In other words, a coupling nut 364 of hardened connector 350 connects to the coupling sleeve 365 of hardened connector 390 for making the optical connection therebetween.

Hardened connector 350 includes a spring 351, a ferrule assembly 352, an inner housing 353, alignment sleeve 354, a retention body 355, one or more O-rings 359, an outer housing 360, a coupling nut 364, a boot 366, and a cap 368. Hardened connector 350 is similar to hardened connector 250 in that it has a retention body 355 having a central bore (not numbered) therethrough for passing optical fiber 32 therethrough and outboard bores (not numbered) for receiving and attaching strength members 34 of fiber optic cable 30 using an epoxy, glue, adhesive, or the like. However, ferrule assembly 352 does not snap-fit to retention body 355; instead, spring 351 biases ferrule assembly 352 forward and inner housing 353 snap-fits to retention body 355 using resilient arms (not numbered), thereby positioning ferrule assembly 352 relative to retention body 355. Specifically, inner housing 355 includes a centrally located hole therethrough sized to allow a portion of the ferrule to protrude beyond the front of inner housing 355 when assembled. As shown, hardened connector 350 includes two different sized O-rings 359. The smaller O-ring is sized to attach to a medial shoulder (not numbered) portion of retention body 355 and the larger O-ring is sized to attach to outer housing 360 at a medial shoulder (not numbered) for sealing portions of the hardened connector. When assembled, the retention body 355 (along with the attached components) slides back into outer housing 360 and is secured therein by alignment sleeve 354.

Figure 19:
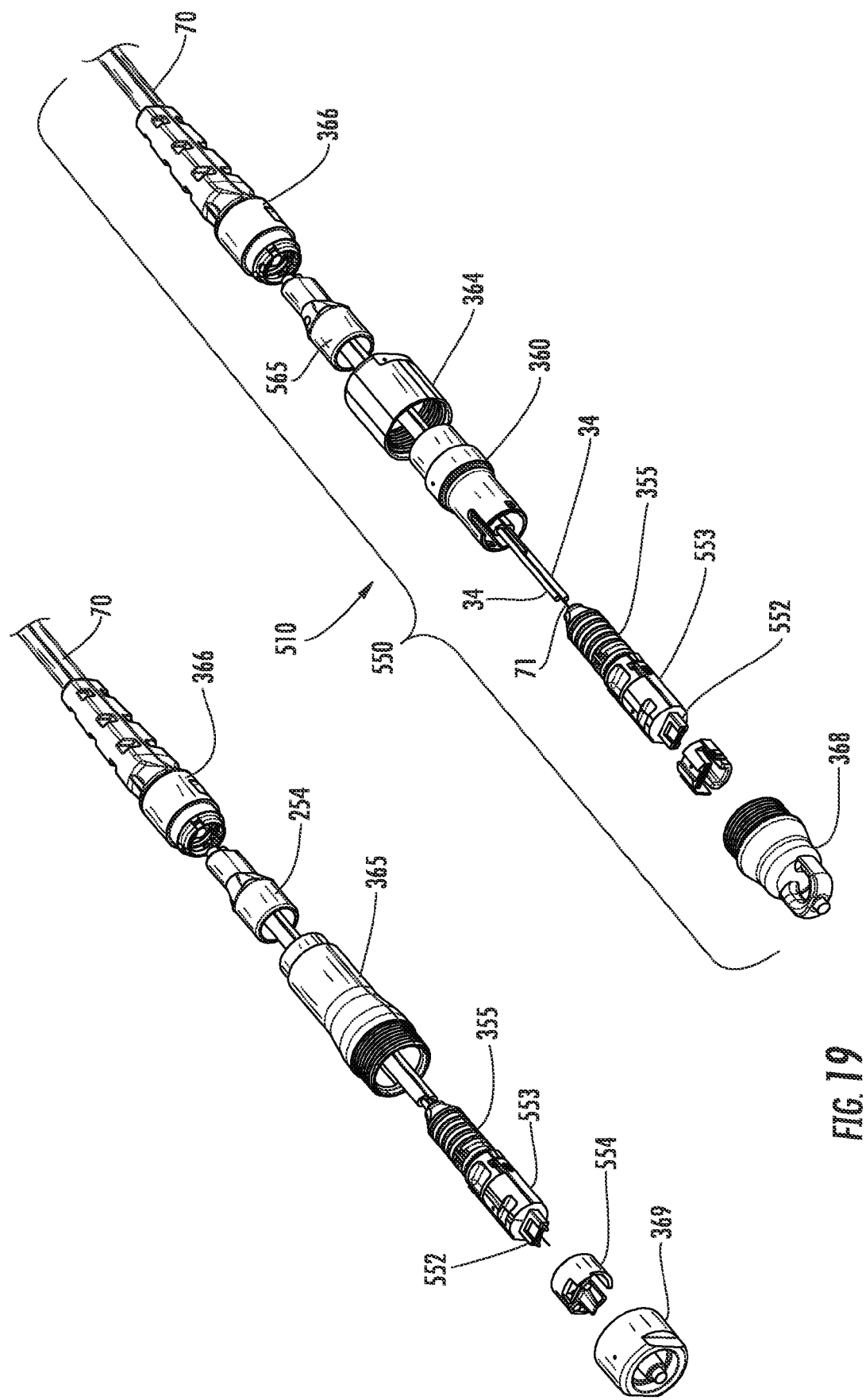
FIG. 19 depicts partially exploded views of two preconnectorized fiber optic cables each having a complementary hardened connector similar to the hardened connectors of FIG. 17 according to the present invention.

As shown, alignment sleeve 354 includes one or more resilient fingers (not numbered) that cooperates with one or more windows (not numbered) on outer housing 360 to secure the components together in the proper position. Retention body 355 is keyed to outer housing 360 using appropriate keying geometry to inhibit rotation therebetween. Outer housing 360 also includes a keying slot (not numbered) as best shown in FIG. 19 for aligning hardened connector 350 with hardened connector 390 and alignment sleeve 354 also includes a keying portion (not visible) such as a recess that aligns with keying slot of outer housing 360. Hardened connector 350 may also include a heat shrink tubing 254 to form a seal between retention body 355 and fiber optic cable 30. Thereafter, boot 366 is attached to outer housing 36 using an epoxy, glue, adhesive, or the like, thereby keeping coupling nut 364 in place. In other words, coupling nut 364 is trapped between a shoulder of outer housing 360 and a shoulder of boot 366 while being free to rotate. When assembled, a portion of outer housing 360 extends beyond coupling nut 364 for insertion into hardened connector 390. As shown, cap 368 can include an eyelet (not numbered) for attaching a pulling device to hardened connector 350 and when installed protects the end portion of hardened connector 350. Additionally, the assembly can optionally include a lanyard (not shown) with one end secured onto boot 366 below coupling nut 364 and the other end of lanyard being attached to cap 368 for keeping it from being lost or misplaced.

Hardened connector 390 includes many of the same components as hardened connector 350. For instance, hardened connector 390 includes spring 351 (not visible), ferrule assembly 352, inner housing 353 (not visible), retention body 355, one or more O-rings 359, heat shrink tube (not visible), and boot 366. Hardened connector 390 also has components that are similar to hardened connector 350 such as a coupling sleeve 365 (instead of coupling nut 364) and a cap 369 that attaches to coupling sleeve 365 for protection; however, no outer housing or similar component is used. Instead, coupling sleeve 365 receives retention body 355 and is keyed to the same to inhibit rotation therebetween; otherwise, hardened connector 390 is similar to hardened connector 350 and assembled in a like fashion. Moreover, retention body 355 is set back a distance from the front end of coupling sleeve 365 to receive an extending portion of hardened connector 350 during mating of the two hardened connectors. Thus, the craft can quickly and easily make a reliable optical connection (or break an optical connection) between the optical fibers of the first and second fiber optic cable.

The concepts of hardened connector 350 and 390 are advantageous because a whole family of hardened connectors can be constructed by simply changing and/or adding a few components, thereby making the hardened connectors adaptable to fiber optic cables having other fiber counts. For instance, by changing the inner housings and the adapter the hardened connectors may be configured for securing more than one ferrule assembly or other types of ferrules, thereby allowing preconnectorization of fiber optic cables having other fiber counts.

Figure 18:
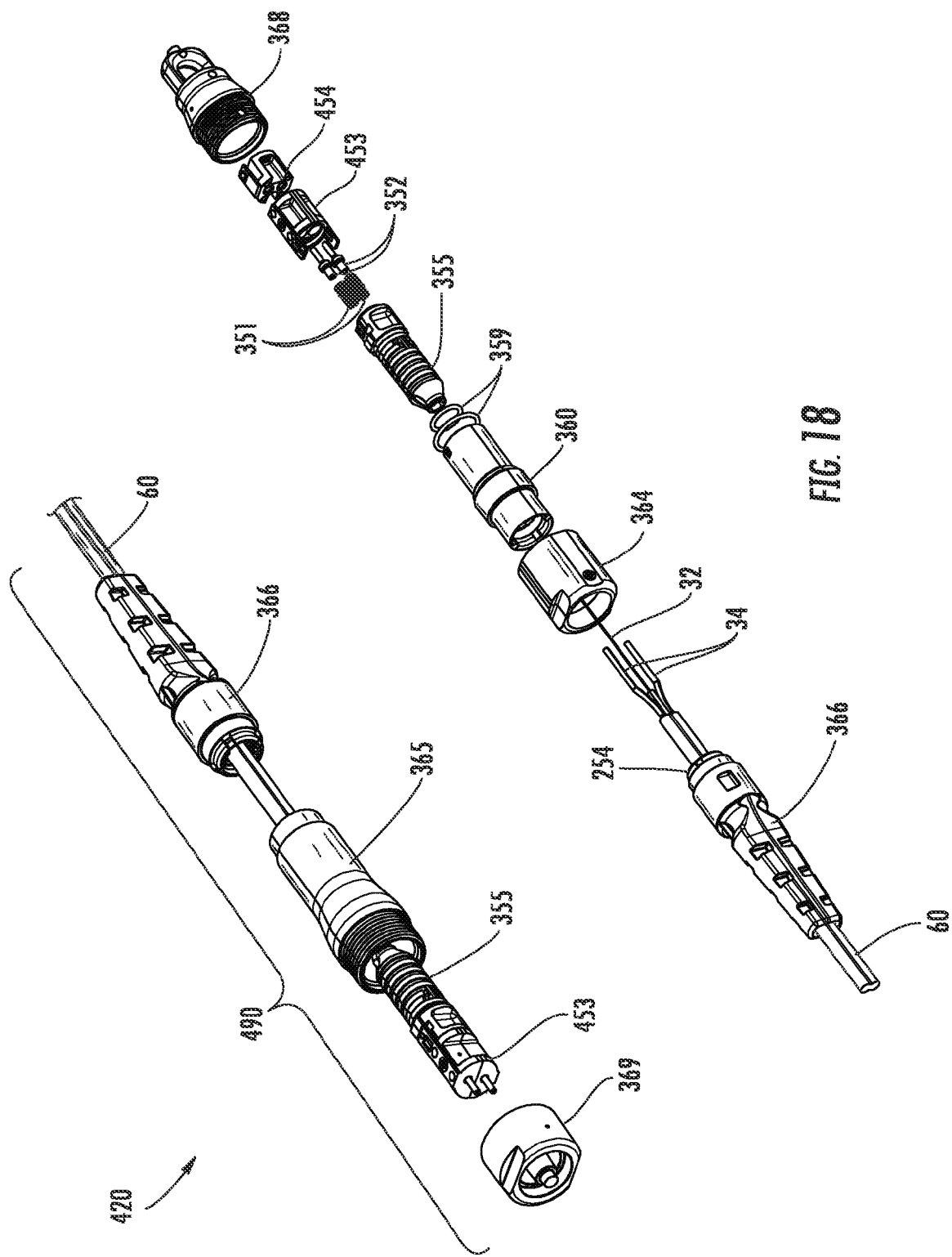
FIG. 18 depicts partially exploded views of two preconnectorized fiber optic cables each having a complementary hardened connector similar to the hardened connectors of FIG. 17 according to the present invention.

By way of example, FIG. 18 depicts complementary preconnectorized fiber optic cables 410 and 420 that are suitable for mating together. Specifically, FIG. 18 shows a partially exploded view of preconnectorized fiber optic cable 410 using a hardened connector 450 on a first fiber optic cable 60 along with a partially exploded view of its complementary preconnectorized fiber optic cable 420 having hardened connector 490 on a second fiber optic cable 60. In other words, hardened connectors 450 and 490 are suitable for fiber optic cables having two optical fibers 32. The components of hardened connector 450 are similar to hardened connector 350, except for inner housing 453 on both hardened connectors and adapter 454. Simply stated, inner housing 453 is similar to inner housing 353, but it includes two spaced apart holes for receiving two respective ferrules 352 therethrough. Likewise, adapter 454 is similar to adapter 354, but it has two spaced apart bores to allow the two ferrules of each hardened connector to mate, instead of a centrally disposed bore.

In other variations, hardened connectors similar to hardened connectors 350 and 390 may include one or more multi-fiber ferrules for preconnectorizing fiber optic cable 70 or other similar fiber optic cables. For instance, FIG. 19 depicts complementary preconnectorized fiber optic cables 510 and 520 that are suitable for mating together. Specifically, FIG. 19 shows a partially exploded view of preconnectorized fiber optic cable 510 using a hardened connector 550 on a first fiber optic cable 70 along with a partially exploded view of its complementary preconnectorized fiber optic cable 520 having hardened connector 590 on a second fiber optic cable 70. In other words, hardened connectors 550 and 590 are suitable for fiber optic cables having multiple optical fibers 32 such as four, eight, twelve, or other suitable fiber counts. The components of hardened connector 550 are similar to hardened connector 350, except for inner housing 553 on both hardened connectors, spring (not visible), and adapter 554. Simply stated, inner housing 553 is similar to inner housing 353, but it includes a rectangular opening for receiving a multi-fiber ferrule 552 therethrough. Likewise, adapter 454 is similar to adapter 354, but it has a rectangular bore to allow the rectangular multi-fiber ferrule of each hardened connector to mate, instead of a centrally disposed bore. Other variations of hardened connectors according to the invention are possible such as multiple multi-fiber ferrules or the like Many modifications and other embodiments of the present invention, within the scope of the claims will be apparent to those skilled in the art. For instance, the concepts of the present invention can be used with any suitable composite cable designs and/or optical stub fitting assemblies. Thus, it is intended that this invention covers these modifications and embodiments as well those also apparent to those skilled in the art.

We claim:

1. A fiber optic cable comprising:
   at least one optical fiber;
   a first strength member;
   a second strength member, wherein the first strength member and the second strength member have an adhesion promoter and are disposed on opposite sides of the at least one optical fiber and generally aligned along a common plane; and
   a cable jacket, the cable jacket contacting the at least one optical fiber, the first strength member, and the second strength member, the cable jacket having a medial height disposed about the at least one optical fiber that is less than an end height, wherein
   the fiber optic cable has an optical attenuation of 0.3 dB or less when disposed in a pressure clamp,
   the fiber optic cable has a height ratio defined as the medial height to end height (MH/EH) of the fiber optic cable, the height ratio being in the range of about 0.6 to 0.9, and
   a spacing between inner surfaces of the first strength member and the second strength member is in the range of 0.8 millimeters to 1.5 millimeters.

2. The fiber optic cable of claim 1, wherein the fiber optic cable has a cable jacket envelope to strength member area ratio, the cable jacket envelope to strength member area ratio being about 5:1 or less.

3. The fiber optic cable of claim 1, wherein the fiber optic cable has a weight of 19 kilograms or less per kilometer.

4. The fiber optic cable of claim 3, wherein the fiber optic cable has a weight of 15 kilograms or less per kilometer.

5. The fiber optic cable of claim 3, wherein the fiber optic cable has a cable jacket envelope to strength member area ratio, the cable jacket envelope to strength member area ratio being 5:1 or less.

6. A fiber optic cable comprising:
   at least one optical fiber;
   a first strength member and a second strength member, wherein the first strength member and the second strength member are disposed on opposite sides of the at least one optical fiber; and
   a cable jacket, the cable jacket contacting the first strength member and the second strength member, the cable jacket having a medial height disposed about the at least one optical fiber that is less than an end height, wherein
   the fiber optic cable has a cable jacket envelope to strength member area ratio, the cable jacket envelope to strength member area ratio being about 5:1 or less,
   the fiber optic cable has a weight of about 19 kilograms or less per kilometer, and
   a spacing between inner surfaces of the first strength member and second strength member is in the range of 0.8 millimeters to 1.5 millimeters.

7. The fiber optic cable of claim 6, wherein the first strength member and the second strength member have an adhesion promoter and are disposed on opposite sides of the at least one optical fiber and generally aligned along a common plane.

8. The fiber optic cable of claim 7, wherein the fiber optic cable has a weight of about 15 kilograms or less per kilometer.

9. A fiber optic cable comprising:
   a single optical fiber;
   a first strength member and a second strength member, wherein the first strength member and the second strength member are disposed on opposite sides of the optical fiber; and
   a cable jacket, the cable jacket contacting the optical fiber, the first strength member, and the second strength member, the cable jacket having a medial height disposed about the optical fiber that is less than an end height, wherein
   the fiber optic cable has a cable jacket envelope to strength member area ratio, the cable jacket envelope to strength member area ratio being about 5:1 or less,
   the fiber optic cable has a weight of about 19 kilograms or less per kilometer, and
   a spacing between inner surfaces of the first strength member and second strength member is in the range of 0.8 millimeters to 1.5 millimeters.

10. The fiber optic cable of claim 9, wherein the first strength member and the second strength member have an adhesion promoter and are disposed on opposite sides of the at least one optical fiber and generally aligned along a common plane.

11. The fiber optic cable of claim 9, wherein the fiber optic cable has a weight of about 15 kilograms or less per kilometer.

* * * * *